United States Patent
Tyner et al.

(10) Patent No.: US 12,472,175 B2
(45) Date of Patent: Nov. 18, 2025

(54) METHODS OF TREATING VENETOCLAX-RESISTANT ACUTE MYELOID LEUKEMIA

(71) Applicant: OREGON HEALTH & SCIENCE UNIVERSITY, Portland, OR (US)

(72) Inventors: Jeffrey Tyner, Portland, OR (US); Tamilla Nechiporuk, Portland, OR (US); Stephen Kurtz, Portland, OR (US); Shannon McWeeny, Portland, OR (US)

(73) Assignee: Oregon Health & Science University, Portland, OR (US)

( * ) Notice: Subject to any disclaimer, the term of this patent is extended or adjusted under 35 U.S.C. 154(b) by 962 days.

(21) Appl. No.: 17/434,278

(22) PCT Filed: Feb. 26, 2020

(86) PCT No.: PCT/US2020/019996
§ 371 (c)(1),
(2) Date: Aug. 26, 2021

(87) PCT Pub. No.: WO2020/176686
PCT Pub. Date: Sep. 3, 2020

(65) Prior Publication Data
US 2022/0133715 A1    May 5, 2022

Related U.S. Application Data

(60) Provisional application No. 62/810,898, filed on Feb. 26, 2019.

(51) Int. Cl.
| | | |
|---|---|---|
| *A61K 31/496* | (2006.01) | |
| *A61K 31/437* | (2006.01) | |
| *A61K 31/4545* | (2006.01) | |
| *A61K 31/506* | (2006.01) | |
| *A61K 31/5377* | (2006.01) | |
| *A61K 31/635* | (2006.01) | |
| *A61P 35/02* | (2006.01) | |

(52) U.S. Cl.
CPC .......... *A61K 31/496* (2013.01); *A61K 31/437* (2013.01); *A61K 31/4545* (2013.01); *A61K 31/506* (2013.01); *A61K 31/5377* (2013.01); *A61K 31/635* (2013.01); *A61P 35/02* (2018.01)

(58) Field of Classification Search
CPC .............. A61K 31/635; A61K 31/5377; A61K 31/506; A61K 31/4545; A61K 31/496; A61K 31/437; A61P 35/02
See application file for complete search history.

(56) References Cited

FOREIGN PATENT DOCUMENTS

WO    WO-2019067666 A1 *    4/2019    ........... A61K 31/095

OTHER PUBLICATIONS

Hayashi (Blood Cancer Journal (2016) 6, e456. p. 1-3) (Year: 2016).*
Rucker (Blood, 2012. vol. 119, No. 9. p. 2114-2121) (Year: 2012).*
Hayashi et al., Crizotinib treatment for refractory pediatric acute myeloid leukemia with RAN-binding protein 2-anaplastic lymphoma kinase fusion gene, Blood Cancer Journal (2016) 6, e456.
Kadia et al., TP53 mutations in newly diagnosed Acute Myeloid Leukemia—Clinico-molecular characteristics, response to therapy, and outcomes, Cancer. Nov. 15, 2016; 122(22): 3484-3491.
Kron et al., Impact of TP53 mutation status on systematic treatment outcome in ALK-rearranged non-small cell lung cancer, Annals of Oncology 29; 2068-2075, 2018.
Prochazka et al., Clinical Implications of subclonal TP53 mutations in acute myeloid leukemia, Haematologica 2019, vol. 104(3): 516-523.
Rucker et al., TP53 alterations in acute myeloid leukemia with complex karyotype correlate with specific copy number alterations, monosomal karyotype, and dismal outcome, Blood, Mar. 1, 2012; vol. 119; No. 9; pp. 2114-2121.
Song et al., Concomitant TP53 mutations with response to crizotinib treatment in patients with ALK-rearranged non-small cell lung cancer, Cancer Medicine. 2019; 8:1551-1557.
Wang et al., TP53 mutations predict for poor survival in ALK rearrangement lung adenocarcinoma patients treated with crizotinib, Journal of Thoracic Diseases, 2018; 10(5): 2991-2998.
Wang et al., TP53 mutations, expression and interaction networks in human cancers, Oncotarget, 2017, vol. 8, No. 1, pp. 624-643.

* cited by examiner

*Primary Examiner* — Kortney L. Klinkel
*Assistant Examiner* — Richard Grant Peckham

(57) ABSTRACT

The present invention concerns novel methods of treatment for venetoclax-resistant acute myeloid leukemia, particularly in subjects with a low expression of TP53 protein or expression of TP53 protein associated with a mutation of the TP53 gene, the methods comprising administering to the subject in need thereof a therapeutically effective amount of a NTRK/ALK/ROS1 inhibitor, or a pharmaceutically acceptable salt thereof.

13 Claims, 24 Drawing Sheets

FIG. 6E REVISIT
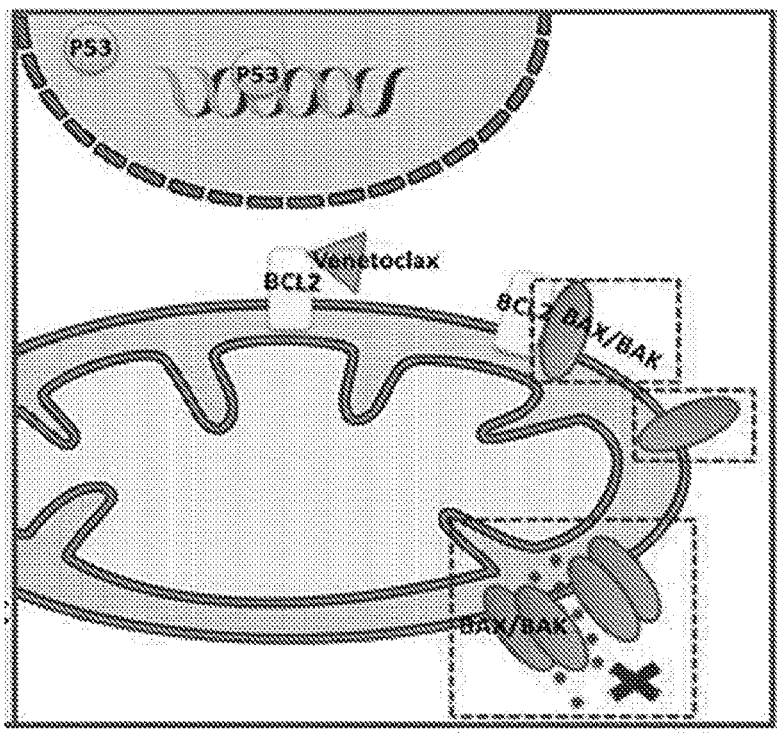
FIG. 7A
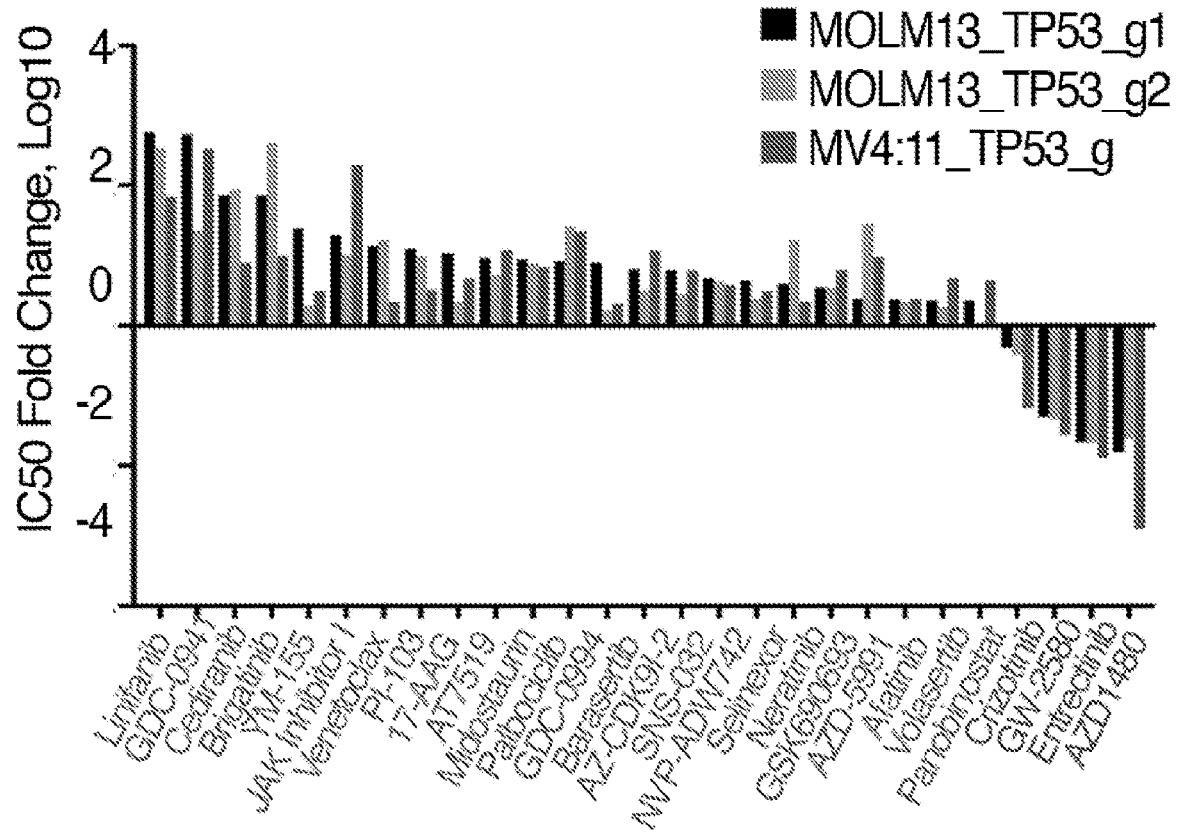

METHODS OF TREATING VENETOCLAX-RESISTANT ACUTE MYELOID LEUKEMIA

GOVERNMENT SUPPORT

This invention was made with government support under U54CA224019 by the National Institutes of Health. The government has certain rights in this invention.

FIELD OF THE INVENTION

The present invention concerns novel methods of treatment for venetoclax-resistant acute myeloid leukemia, particularly in subjects with a low expression of TP53 protein or expression of TP53 protein associated with a mutation of the TP53 gene.

BACKGROUND OF THE INVENTION

Acute myeloid leukemia is challenging to treat due to its heterogeneity, and single-agent therapies have universally failed, prompting a need for innovative drug combinations. We used a genetic approach to identify genes whose inactivation contribute to drug resistance as a means of forming preferred drug combinations to improve AML treatment.

Resisting cell death is a hallmark of cancer as well as an essential feature of acquired drug resistance [1] [2] [3]. To maintain their growth and survival, cancer cells often modulate cell death mechanisms by overexpression of anti-apoptotic BCL2 family members, including BCL2, BCL2L1 and MCL1. This overexpression aims to neutralize BH3 domains of apoptotic activators BID, BIM and PUMA, thus preventing liberation of pro-apoptotic proteins BAX/BAK from inhibitory interactions with anti-apoptotic BCL2 family proteins [4] [5] [6]. Elevated levels of MCL1 protein are commonly observed in cancer and are associated with poor survival in myeloid hematologic malignancies [7] [8] [9] [10]. Aberrant pro-survival regulation can also be achieved by inactivation of TP53 function, which controls many aspects of apoptosis [11, 12]. These processes alter the balance of pro-apoptotic and anti-apoptotic proteins, permitting cancer cells, otherwise primed for apoptosis, to survive and resist therapies.

The elucidation of BH3 protein family interactions involved in promoting or inhibiting apoptosis has enabled the development of small molecule inhibitors targeting specific anti-apoptotic family members leading to release of the pro-apoptotic proteins BAX/BAK, their oligomerization and mitochondrial outer membrane permeabilization and, ultimately, execution of the irreversible apoptotic cascade [13-15] [16]. The latest generation of BH3-mimetics, venetoclax, targets BCL2 protein only, thus, overcoming the deficiencies and side effects of its predecessors, navitoclax and ABT-737, which targeted BCL2 and BCL2L1. Venetoclax is an approved therapeutic for use in chronic lymphocytic leukemia patients and its efficacy has been evaluated for other hematologic malignancies including acute myelogenous leukemia (AML) [17-21]. Intrinsic or acquired resistance is a central concern with single agent, targeted therapies with many instances now documenting favorable initial responses that give way to disease relapse resulting from loss of drug sensitivities [22].

There remain needs for methods and pharmaceutical agents and combinations for the treatment of venetoclax-resistant AML.

BRIEF SUMMARY OF THE INVENTION

For venetoclax, both acquired and intrinsic resistance is anticipated from initial clinical studies using venetoclax monotherapy on relapsed/refractory AML patients, which have shown modest efficacy due to either intrinsic or acquired drug resistance [20]. The efficacy of venetoclax in AML patients is dependent on BCL2 expression levels, and resistance to venetoclax may result from overexpression of the anti-apoptotic proteins MCL1 or BCL2L1 [17, 20]. Similar mechanisms have been observed in lymphoma cell lines, as several studies have shown resistance to venetoclax develops primarily through alterations in levels of other anti-apoptotic proteins [23, 24]. AML cell lines rendered resistant to venetoclax through prolonged exposure develop a dependency on MCL1 or BCL2L1 [25, 26]. In AML cells, the dependency on MCL1 for survival can be overcome by MAPK/GSK3 signaling via activation of TP53, which when coupled with BCL2 inhibition, enhances the anti-leukemic efficacy of venetoclax [27].

Drug combinations offer a strategy to overcome limitations in the durability and overall effectiveness of targeted agents resulting from intrinsic mechanisms of resistance. Understanding these mechanisms is essential for identifying drug targets that will form the basis for new combinatorial therapeutic strategies to circumvent drug resistance. To identify essential target genes and pathways contributing to venetoclax resistance in AML, we used a genome-wide CRISPR/Cas9 screen on an AML patient-derived cell line, MOLM-13. Our findings identify TP53, BAX, and PMAIP1 as key genes whose inactivation establishes venetoclax resistance, centering on regulation of the mitochondrial apoptotic network as a mechanism of controlling drug sensitivity. Cell lines with TP53 or BAX knockouts (KO) show perturbations in metabolic profile, energy production and mitochondrial homeostasis. In addition, TP53 KO cells acquired sensitivity to NTRK inhibitors suggesting a new dependency on this survival pathway, indicating changes in transcriptional activity in the venetoclax-resistant setting may offer drug combinations to overcome resistance.

Provided herein is a method of treating venetoclax-resistant acute myeloid leukemia in a subject, wherein the venetoclax-resistant acute myeloid leukemia is characterized by low expression of TP53 or expression associated with a mutation in the TP53 gene, the method comprising administering to the subject in need thereof a therapeutically effective amount of a NTRK/ALK/ROS1 inhibitor, or a pharmaceutically acceptable salt thereof.

BRIEF DESCRIPTION OF THE SEVERAL VIEWS OF THE DRAWINGS

FIG. 6E represents mechanisms of venetoclax resistance in cells with inactivation of BAX.

FIG. 7A represents fold changes in $IC_{50}$ values for inhibitors concordant across MOLM-13 and MV4;11 cells lines relative to non-targeting control.

DETAILED DESCRIPTION OF THE INVENTION

Figure 1A:
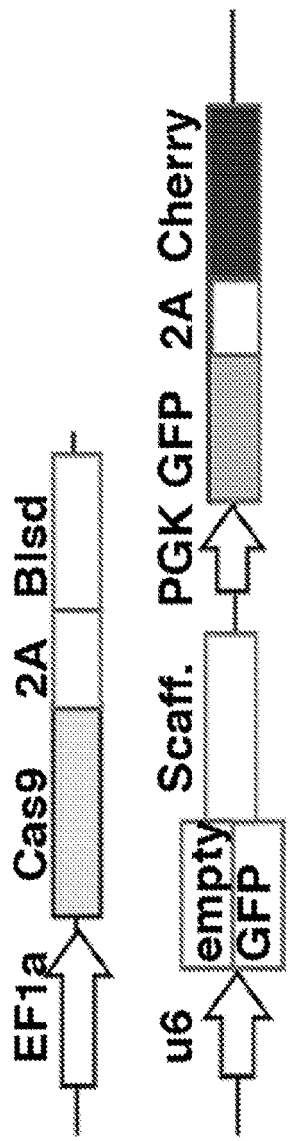
FIG. 1A provides a schematic representation of lentiviral vectors used for the delivery and functional assay of Cas9.

Also provided herein is a method of treating venetoclax-resistant acute myeloid leukemia in a subject, wherein the venetoclax-resistant acute myeloid leukemia is characterized by low expression of TP53, the method comprising administering to the subject in need thereof a therapeutically effective amount of a NTRK/ALK/ROS1 inhibitor, or a pharmaceutically acceptable salt thereof.

Further provided herein is a method of treating venetoclax-resistant acute myeloid leukemia in a subject, wherein the venetoclax-resistant acute myeloid leukemia is characterized by a mutation in the TP53 gene, the method comprising administering to the subject in need thereof a therapeutically effective amount of a NTRK/ALK/ROS1 inhibitor, or a pharmaceutically acceptable salt thereof. In some embodiments, the mutation in the TP53 gene is a point mutation. In other embodiments, the mutation is a TP53 deletion. In further embodiments, the TP53 deletion is a monoallelic deletion. In other embodiments, the TP53 deletion is a biallelic deletion.

In some embodiments, the NTRK/ALK/ROS1 inhibitor is selected from the group of entrectinib, larotrectinib, crizotinib, larotrectinib, alectinib, lorlatinib, ceritnib, repotrectinib, GW-2580 and AZD1480

In each of the methods described herein, there is a further embodiment in which the method of treatment further comprises administering to the subject in need thereof a therapeutically effective amount of venetoclax, or a pharmaceutically acceptable salt thereof.

Crizotinib (XALKORI®, Pfizer Inc.) may be administered in the methods of treatment herein at a daily dose of from about 50 mg to about 300 mg once or twice daily. In some embodiments, crizotinib is administered at a dose of from about 100 mg to about 300 mg once daily. In other embodiments, crizotinib is administered at a dose of from about 100 mg to about 250 mg twice daily.

Ceritinib (ZYKADIA®, Novartis International AG) may be administered in the methods of treatment herein at a daily dose of from about 150 mg to about 800 mg once or twice daily. In some embodiments, ceritinib is administered at a dose of from about 150 mg to about 800 mg once daily. In other embodiments, ceritinib is administered at a dose of from about 100 mg to about 600 mg twice daily.

Alectinib (ALECENSA®, Chugai Pharmaceutical Co.) may be administered in the methods of treatment herein at a daily dose of from about 150 mg to about 800 mg once or twice daily. In some embodiments, alectinib is administered at a dose of from about 150 mg to about 800 mg once daily. In other embodiments, alectinib is administered at a dose of from about 100 mg to about 600 mg twice daily.

Lorlatinib (LORBRENA, Pfizer Inc.) may be administered in the methods of treatment herein at a daily dose of from about 25 mg to about 200 mg once or twice daily. In some embodiments, alectinib is administered at a dose of from about 25 mg to about 100 mg once daily. In other embodiments, alectinib is administered at a dose of from about 25 mg to about 100 mg twice daily.

Larotrectinib (Loxo Oncology, Inc.) may be administered in the methods of treatment herein at a daily dose of from about 25 mg to about 200 mg once or twice daily. In some embodiments, larotrectinib is administered at a dose of from about 25 mg to about 100 mg once daily. In other embodiments, larotrectinib is administered at a dose of from about 25 mg to about 100 mg twice daily.

Definitions

The term "therapeutically effective amount" or "pharmaceutically effective amount" refers to an amount that is sufficient to effect treatment, as defined below, when administered to a subject (e.g., a mammal, such as a human) in need of such treatment. The therapeutically or pharmaceutically effective amount will vary depending upon the subject and disease condition being treated, the weight and age of the subject, the severity of the disease condition, the manner of administration and the like, which can readily be determined by one of ordinary skill in the art. For example, a "therapeutically effective amount" or a "pharmaceutically effective amount" of a compound of Formula I, or a pharmaceutically acceptable salt or co-crystal thereof, is an amount sufficient to modulate NTRK/ALK/ROS1 expression or activity, and thereby treat a subject (e.g., a human) suffering an indication, or to ameliorate or alleviate the existing symptoms of the indication. For example, a therapeutically or pharmaceutically effective amount may be an amount sufficient to decrease a symptom of a disease or condition responsive to inhibition of NTRK/ALK/ROS1 activity.

"Treatment" or "treating" is an approach for obtaining beneficial or desired results including clinical results. Beneficial or desired clinical results may include one or more of the following: (i) inhibiting the disease or condition (e.g., decreasing one or more symptoms resulting from the disease or condition, and/or diminishing the extent of the disease or condition); (ii) slowing or arresting the development of one or more clinical symptoms associated with the disease or condition (e.g., stabilizing the disease or condition, preventing or delaying the worsening or progression of the disease or condition, and/or preventing or delaying the spread (e.g., metastasis) of the disease or condition); and/or (iii) relieving the disease, that is, causing the regression of clinical symptoms (e.g., ameliorating the disease state, providing partial or total remission of the disease or condition, enhancing effect of another medication, delaying the progression of the disease, increasing the quality of life, and/or prolonging survival).

The terms "inhibiting" or "inhibition" indicates a decrease, such as a significant decrease, in the baseline activity of a biological activity or process. "Inhibition of NTRK/ALK/ROS1 activity" refers to a decrease in NTRK/ALK/ROS1 activity as a direct or indirect response to the presence of a compound of Formula I, or a pharmaceutically acceptable salt or co-crystal thereof, relative to the activity of NTRK/ALK/ROS1 in the absence of such compound or a pharmaceutically acceptable salt or co-crystal thereof. The decrease in activity may be due to the direct interaction of the compound with NTRK/ALK/ROS1, or due to the interaction of the compound(s) described herein with one or more other factors that in turn affect NTRK/ALK/ROS1 activity. For example, the presence of the compound(s) may decrease NTRK/ALK/ROS1 activity by directly binding to the NTRK/ALK/ROS1, by causing (directly or indirectly) another factor to decrease NTRK/ALK/ROS1 activity, or by (directly or indirectly) decreasing the amount of NTRK/ALK/ROS1 present in the cell or organism. In some embodiments, the inhibition of NTRK/ALK/ROS1 activity may be compared in the same subject prior to treatment, or other subjects not receiving the treatment. The term "inhibitor" is understood to refer to a compound or agent that, upon administration to a human in need thereof at a pharmaceutically or therapeutically effective dose, provides the inhibition activity desired.

"Delaying" the development of a disease or condition means to defer, hinder, slow, retard, stabilize, and/or postpone development of the disease or condition. This delay can be of varying lengths of time, depending on the history of the disease or condition, and/or subject being treated. A method that "delays" development of a disease or condition is a method that reduces probability of disease or condition development in a given time frame and/or reduces the extent of the disease or condition in a given time frame, when compared to not using the method. Such comparisons are typically based on clinical studies, using a statistically significant number of subjects. Disease or condition development can be detectable using standard methods, such as routine physical exams, mammography, imaging, or biopsy. Development may also refer to disease or condition progression that may be initially undetectable and includes occurrence, recurrence, and onset.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 1 0" is inclusive of the endpoints, 2 and 10, and all the intermediate values).

By "significant" is meant any detectable change that is statistically significant in a standard parametric test of statistical significance such as Student's T-test, where p<0.05.

The term "level of expression" herein refers to the rate of processing information from a gene in the synthesis of a gene product, particularly of a functional gene product. In different embodiments gene expression may be indicated by transcriptional expression of mRNA levels or protein levels.

It should be understood that reference herein to determining the "level of expression" of a gene is intended as referring to the use of any suitable technique that will provide information in relation to the level of expression of the encoding nucleic acid molecule (DNA or mRNA) or the encoded protein or polypeptide in the relevant tissue of the subject. Accordingly, these techniques include both in vivo techniques, as well as in vitro techniques that may be applied to a biological sample extracted from the subject. Such in vitro techniques are likely to be preferred due to their significantly more simplistic and routine nature. Those skilled in the art will readily appreciate that in accordance with embodiments of the present disclosure gene expression may be determined by any suitable technique or assay known in the art. Methods disclosed herein typically require quantitation of expression levels. Analysis of gene expression at the level of the mRNA may use amplification based assays such as reverse-transcription PCR (RT-PCR) coupled with real time quantitative PCR (qPCR). Other suitable methods include but are not limited to microarrays, ligase chain reaction, oligonucleotide ligation assay, next generation sequencing, northern blotting, in situ hybridization and further statistical analysis to determine differential expression. Exemplary methods for determining expression at the protein or polypeptide level include, for example, immunoassay using an antibody(ies) that bind with the protein such as enzyme-linked immunosorbent assay (ELISA) or immunoblotting, 2D-gel electrophoresis (including 2D-DIGE), multiplex protein expression assays, western blotting, immunoprecipitation assays, HPLC, LC/MS, flow cytometry and protein expression profiling arrays and microarrays. Those skilled in the art will appreciate that the present disclosure is not limited by reference to the means by which gene expression is determined and/or quantified.

"Pharmaceutically acceptable salts" include, for example, salts with inorganic acids and salts with an organic acid. Examples of salts may include hydrochloride, phosphate, diphosphate, hydrobromide, sulfate, sulfinate, nitrate, malate, maleate, fumarate, tartrate, succinate, citrate, acetate, lactate, methanesulfonate (mesylate), benzenesulfonate (besylate), p-toluenesulfonate (tosylate), 2-hydroxyethylsulfonate, benzoate, salicylate, stearate, and alkanoate (such as acetate, HOOC—$(CH_2)_n$—COOH where n is 0-4). In addition, if the compounds described herein are obtained as an acid addition salt, the free base can be obtained by basifying a solution of the acid salt. Conversely, if the product is a free base, an addition salt, particularly a pharmaceutically acceptable addition salt, may be produced by dissolving the free base in a suitable organic solvent and treating the solution with an acid, in accordance with conventional procedures for preparing acid addition salts from base compounds. Those skilled in the art will recognize various synthetic methodologies that may be used to prepare nontoxic pharmaceutically acceptable addition salts.

The term "crystal forms" and related terms herein refer to the various crystalline modifications of a given substance, including, but not limited to, polymorphs, solvates, hydrates, co-crystals, and other molecular complexes, as well as salts, solvates of salts, hydrates of salts, other molecular complexes of salts, and polymorphs thereof. Crystal forms of a substance can be obtained by a number of methods, as known in the art. Such methods include, but are not limited to, melt recrystallization, melt cooling, solvent recrystallization, recrystallization in confined spaces such as, e.g., in nanopores or capillaries, recrystallization on surfaces or templates, such as, e.g., on polymers, recrystallization in the presence of additives, such as, e.g., co-crystal countermolecules, desolvation, dehydration, rapid evaporation, rapid cooling, slow cooling, vapor diffusion, sublimation, grinding and solvent-drop grinding.

"Subject" refers to an animal, such as a mammal, that has been or will be the object of treatment, observation or experiment. The methods described herein may be useful in both human therapy and veterinary applications. In some embodiments, the subject is a mammal; in some embodiments the subject is human; and in some embodiments the subject is chosen from cats and dogs. "Subject in need thereof" or "human in need thereof" refers to a subject, such as a human, who may have or is suspected to have diseases or conditions that would benefit from certain treatment; for example treatment with a NTRK/ALK/ROS1 modulating compound, or a pharmaceutically acceptable salt or co-crystal thereof, as described herein. This includes a subject who may be determined to be at risk of or susceptible to such diseases or conditions, such that treatment would prevent the disease or condition from developing.

Results

Genome-wide screen reveals TP53 apoptosis network controlling venetoclax resistance.

Figure 1B:
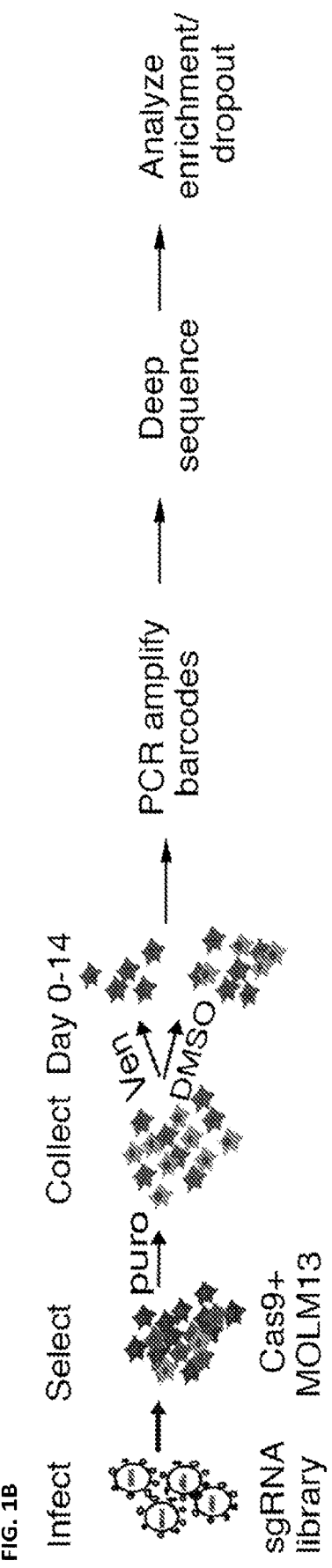
FIG. 1B represents a schematic representation of genome wide screen for drug resistance.
Figure 1C:
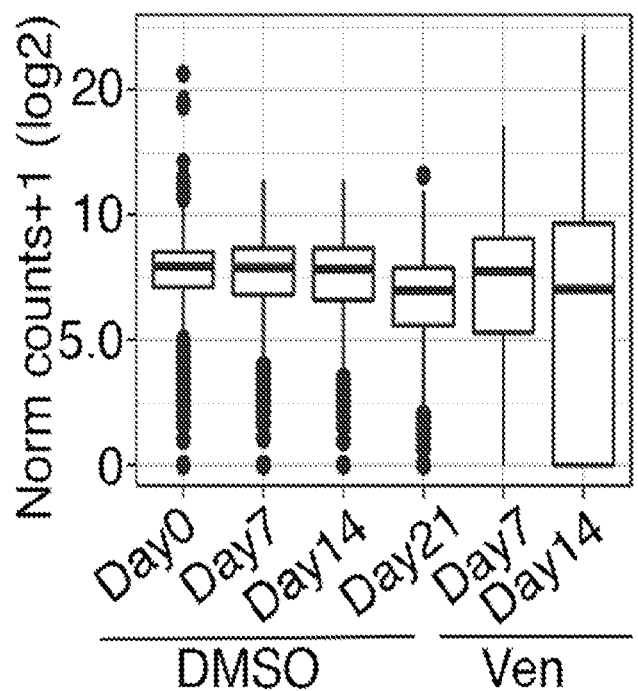
FIG. 1C represents normalized counts of sgRNAs from collected DNA samples.
Figure 1D:
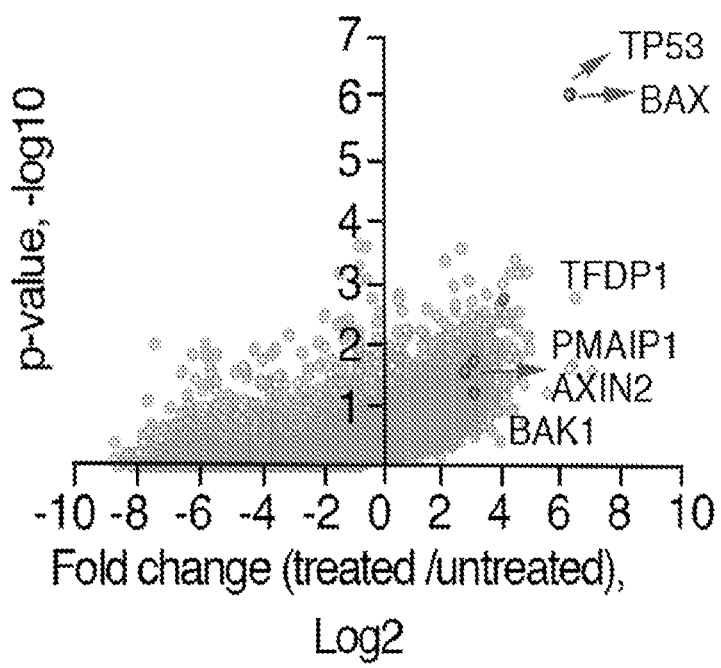
FIG. 1D represents enrichment effect in a Y. Kosuke library screen for loss-of-sensitivity to venetoclax.
Figure 1E:
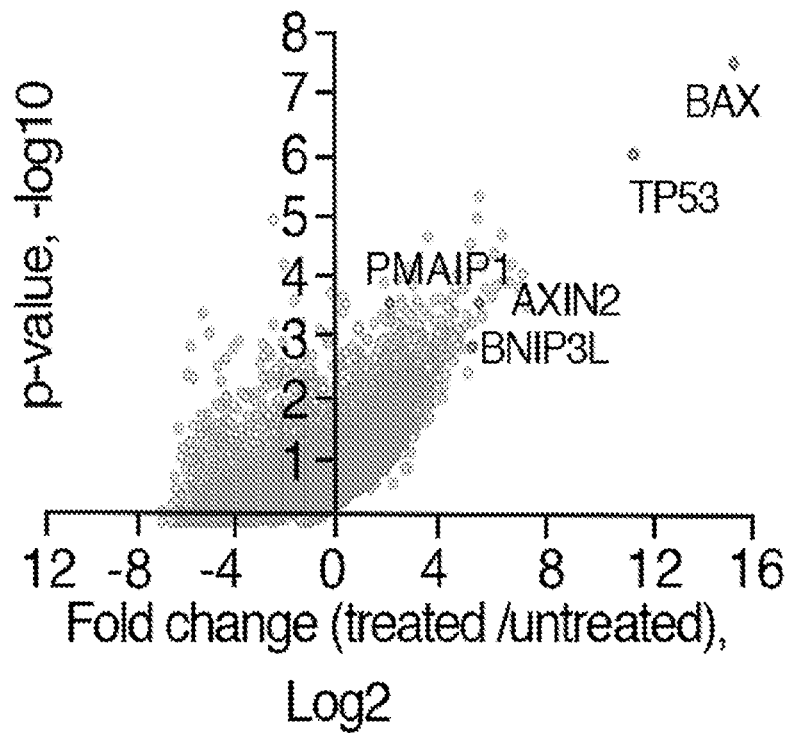
FIG. 1E represents enrichment effect in a Brunello library screen for loss-of-sensitivity to venetoclax.
Figure 1F:
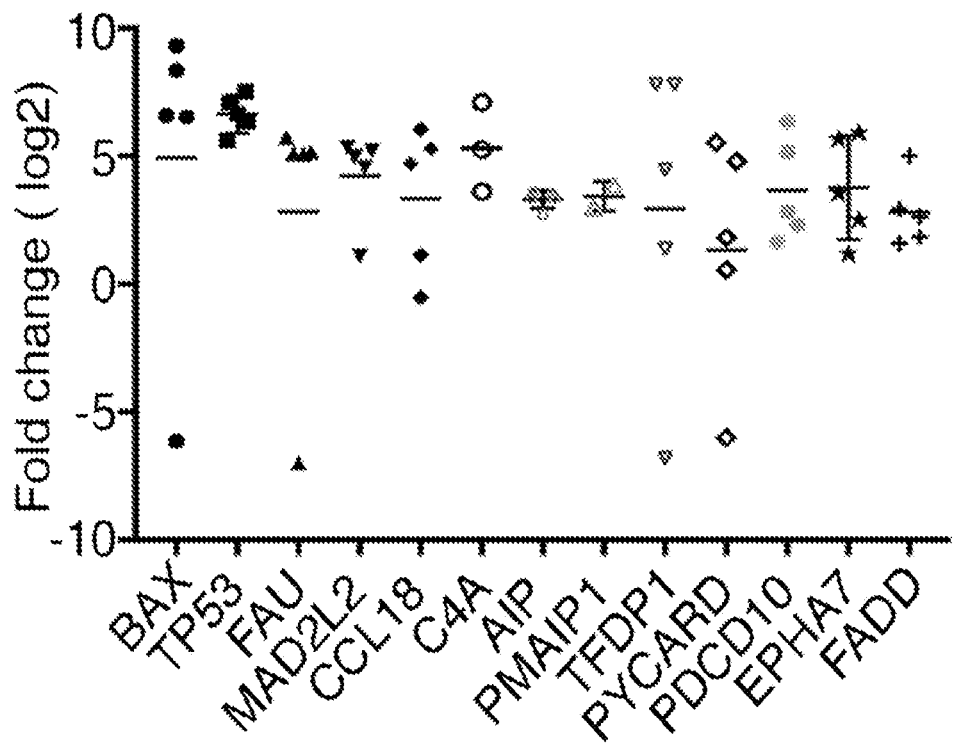
FIG. 1F represents an enrichment extent plotted as fold change over control following venetoclax exposure (day 14) for the set of individual top hit sgRNAs per gene is shown (Y. Kosuke library).
Figure 1G:
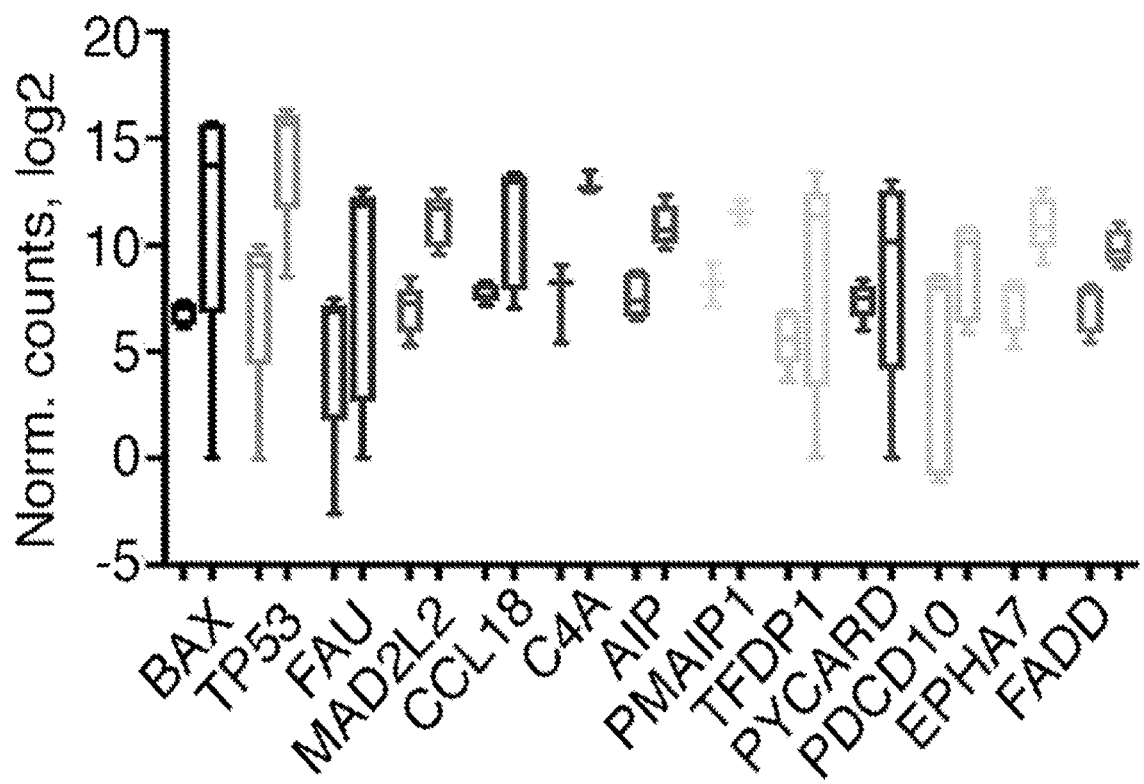
FIG. 1G represents box and whisker plots spanning min/max values of normalized counts for control venetoclax treatment combined for all sgRNAs per gene.
Figure 10:
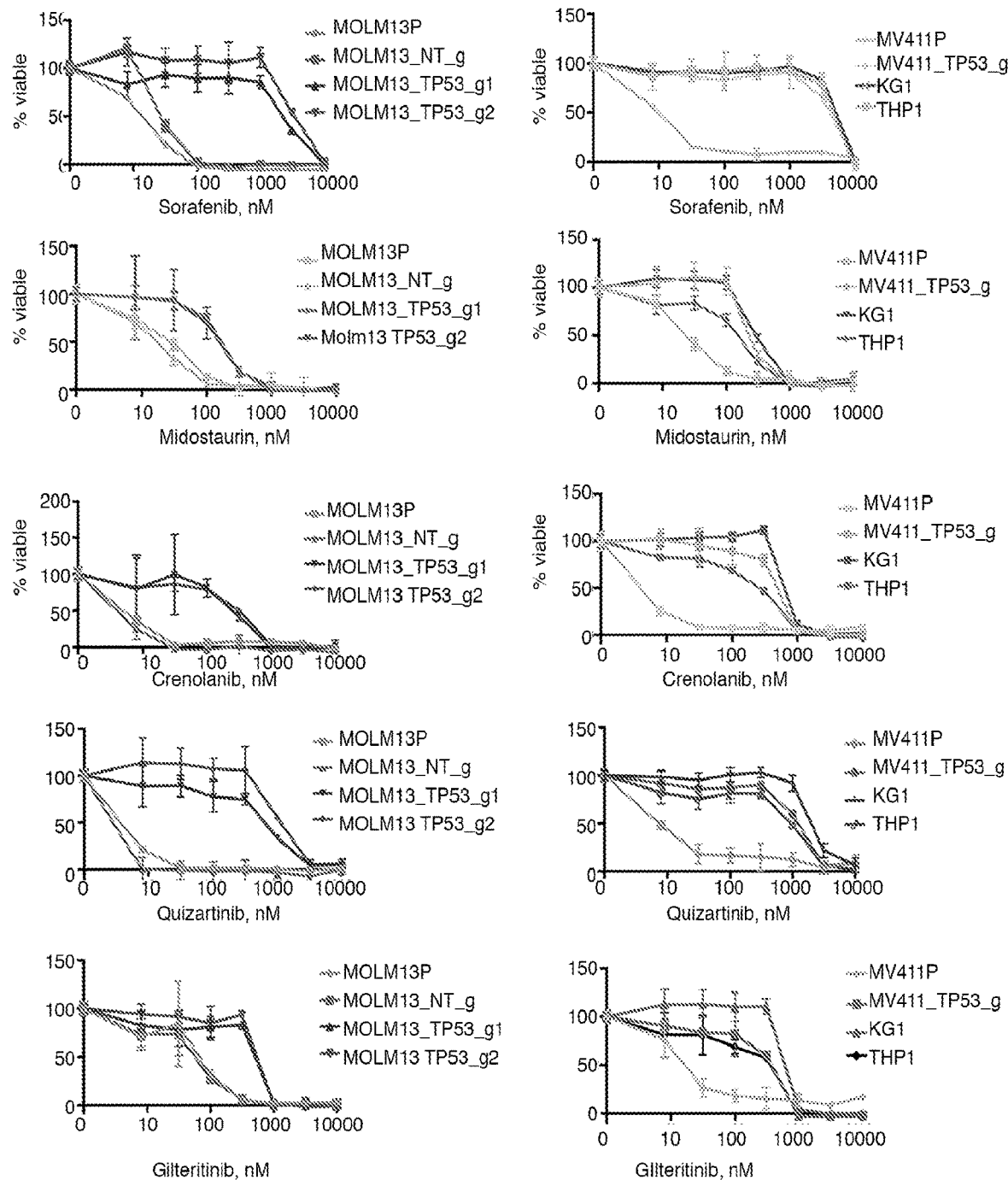
FIG. 10 provides dose response curve responses used to create histograms for FIG. 7B.

To understand possible mechanisms of venetoclax resistance in the setting of AML, we screened an AML cell line, MOLM-13, which harbors the most common genetic lesion observed in AML (FLT3-ITD), for loss-of-function genes conferring venetoclax resistance. We initially generated Cas9-expressing MOLM-13 cells as described ([28] and FIG. 1A) and confirmed Cas9 functionality. Systematic genetic perturbations on a genome-wide scale were introduced by infecting Cas9-expressing cells with lentiviruses carrying a CRISPR library consisting of an average of 5 sgRNA guides per gene for 18,010 genes [28]. After transduction, we further selected cells with puromycin for 5 days to ensure stable guide integration, and then subjected cells to either treatment with 1 μM venetoclax or vehicle alone (DMSO) for 14 days while collecting DNA at various time points (FIG. 1B). PCR-amplified libraries of barcodes representing unique sgRNA sequences obtained from DNA extracted from either control (DMSO) or drug-treated cells were subjected to deep sequencing and analyzed using a modified MaGECK pipeline analysis [29] (FIG. 10, Supplementary Table 1). Plotting the average log fold change for sgRNA counts versus cumulative p-values per gene generated by robust rank aggregation analyses revealed a high enrichment of TP53 and BAX in venetoclax-resistant populations as well as a significant enrichment for several other proteins involved in the apoptosis pathway or mitochondrial homeostasis, such as PMAIP1 (NOXA), TFDP1 and BAK1 (BAK) (FIG. 1D). These findings are in agreement with results of a similar screen, described in a companion paper by Chen, Glytsou and colleagues (ref). To confirm our results, we performed a parallel screen in MOLM-13 cells using a distinct genome-wide library, Brunello [30], which also identified TP53, BAX, and PMAIP1 among the top-enriched sgRNAs (FIG. 1E and Supplementary Tables 2-4). The distribution of concordance, defined as a statistically-significant increase or decrease (p<0.05) in the same direction among all sgRNAs for a given gene, showed higher average percent concordance in the Y. Kosuke library screen compared to the Brunello library screen (0.77±0.07, n=916, vs 0.62±0.004, n=2310, unpaired two-tailed t-test, p<0.0001), therefore, we focused on the Y. Kosuke screen results for pathway analyses. Ranking genes with statistically significant enriched sgRNAs (p-value<0.05) based on concordance and a log fold change (LFC) compared to controls, identified 235 genes (Supplementary Table 5). Gene profiler analyses of these 235 candidates indicated an enrichment in genes involved in mitochondrial processes, such as apoptosis transcriptional regulation (TP53, TFDP1 [13, 31]), apoptosis sensitization (PMAIP1(NOXA) [32]), proteins required for mitochondrial membrane pore formation (BAX, BAK, SLC25A6, TMEM14A [13, 31]), and additional proteins involved in apoptosis (pro-apoptotic BNIP3L [33] (Table 1). The top-enriched sgRNAs showed a high degree of concordance in fold change relative to controls (FIG. 1F) and had a baseline of more than 100 normalized counts in control samples, precluding artificial inflation of fold changes in resistant cells (FIG. 1G).

Prioritization of Genome-Wide Screen Candidates

Figure 8:
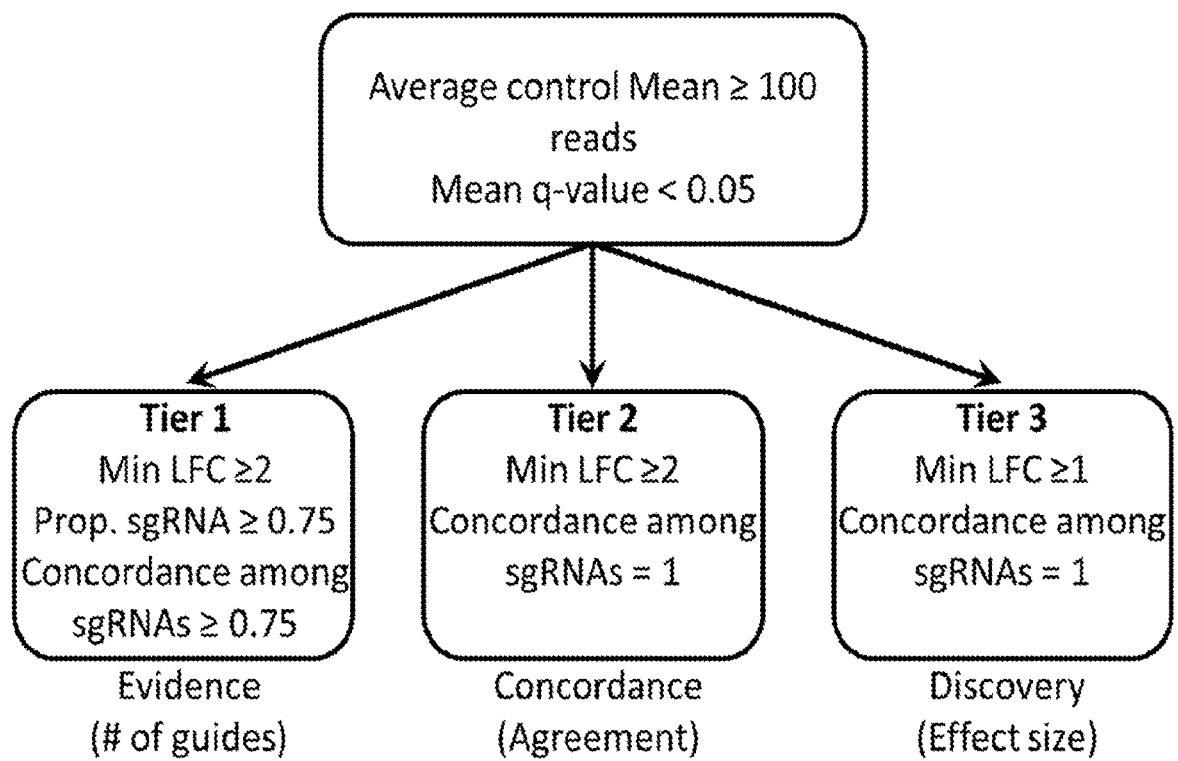
FIG. 8 provides an illustrated scheme indicating a process of prioritizing sgRNA hits from a genome-wide screen.

Our study used two independent sgRNA guide libraries, which provided a high degree of confidence with respect to the top hits identified. Analyses of genome wide CRISPR screen knockouts is challenged by off-targeting, sgRNA guide efficiency, and other factors that can lead to library specific artifacts and striking differences between libraries [28, 30]. To prioritize candidates for validation, we developed a tier structure that incorporates three key factors: evidence (determined by the number of sgRNA guide hits per gene), concordance (indicated by the agreement across the set of guides for a given gene) and discovery (based on expanding effect size threshold) to rank sgRNA hits and enable a progression to pathway analysis for lower scoring hits (FIG. 8). Using this prioritization scheme, the Tier 1 hits (n=149), revealed significant biological identity with the TP53 Regulation of cytochrome C release pathway (Reactome; corrected p<0.001), which is concordant with our initial analysis (Table 1).

Inactivation of Genes as Single Knockouts Confirms Resistance to Venetoclax and Validates the Screen.

Figure 2A:
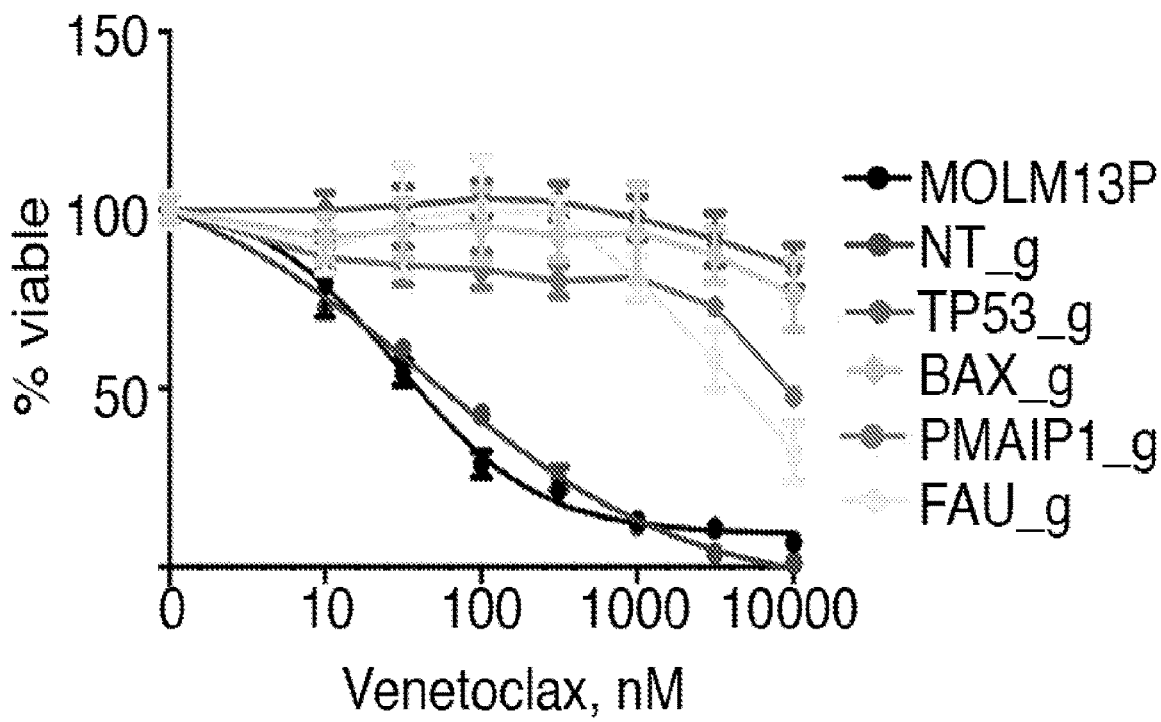
FIG. 2A represents MOLM-13 cells transduced with lentiviruses carrying single sgRNA/Cas9 constructs targeting TP53, BAX, PMAIP1, FAU or control.
Figure 2B:
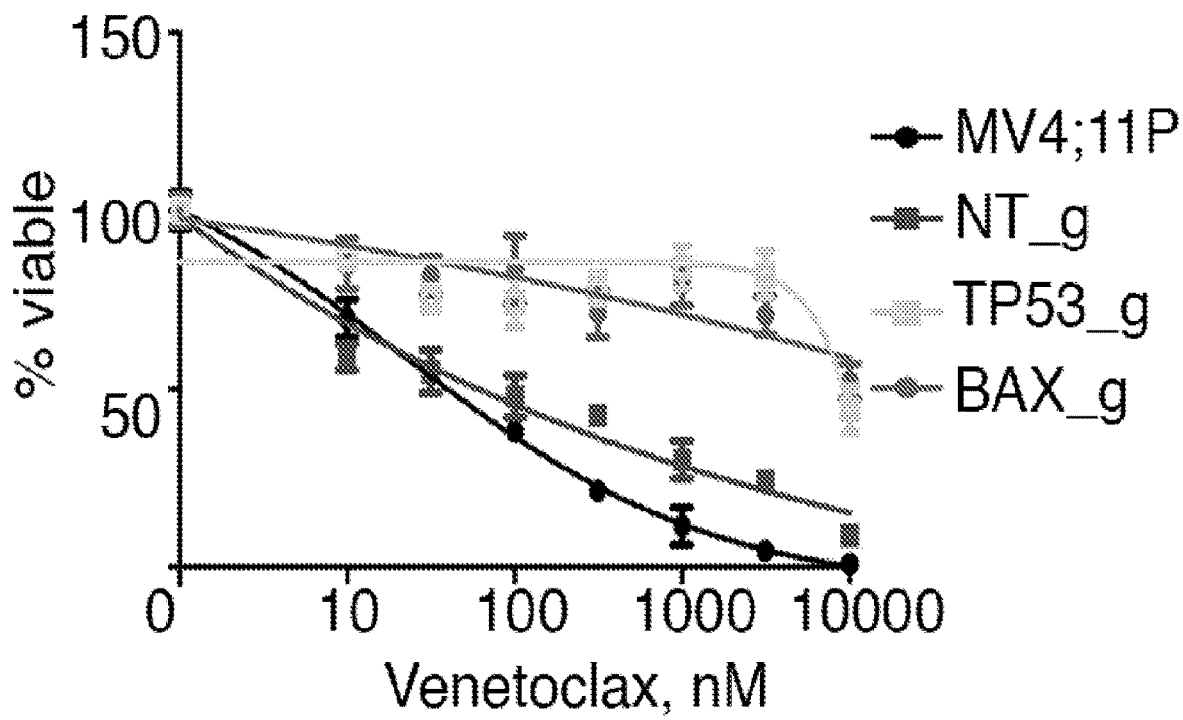
FIG. 2B represents MV4;11 cells transduced with lentiviruses carrying single sgRNA/Cas9 constructs targeting TP53, BAX, PMAIP1, FAU or control.
Figure 2C:
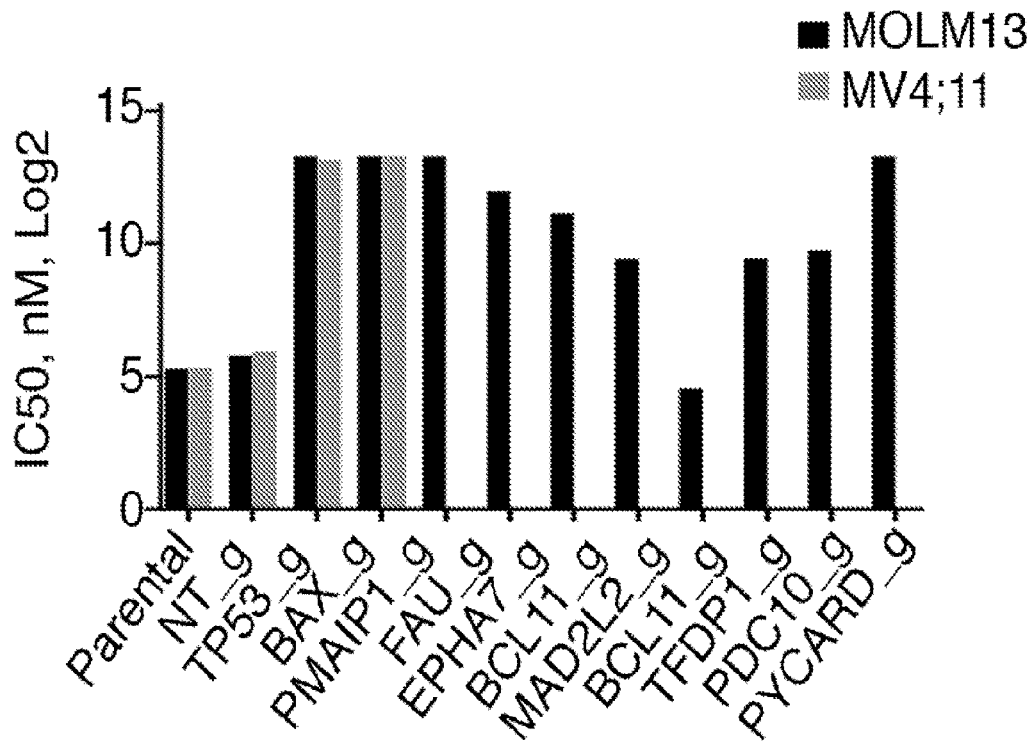
FIG. 2C provides a histogram (log 2 scale) summarizing changes in venetoclax sensitivity in parental MOLM-13 (black shaded), parental MV4;11 cells (grey shaded) or cells transduced with indicated sgRNA/Cas9 viruses.
Figure 2D:
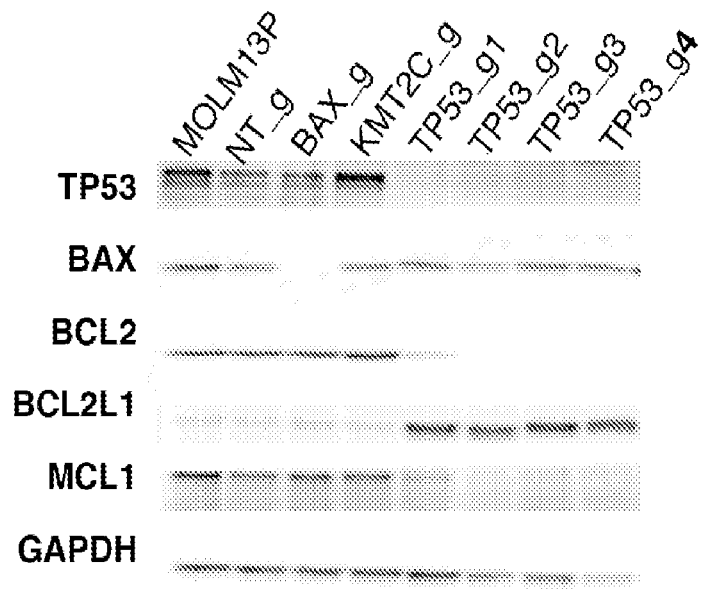
FIG. 2D depicts a Western blot analyses of proteins extracted from MOLM-13 cells, transduced with indicated sgRNA/Cas9 viruses and identified with antisera to BAX, BCL2, BCL2L1(BCLXL), MCL1 and GAPDH.
Figure 2E:
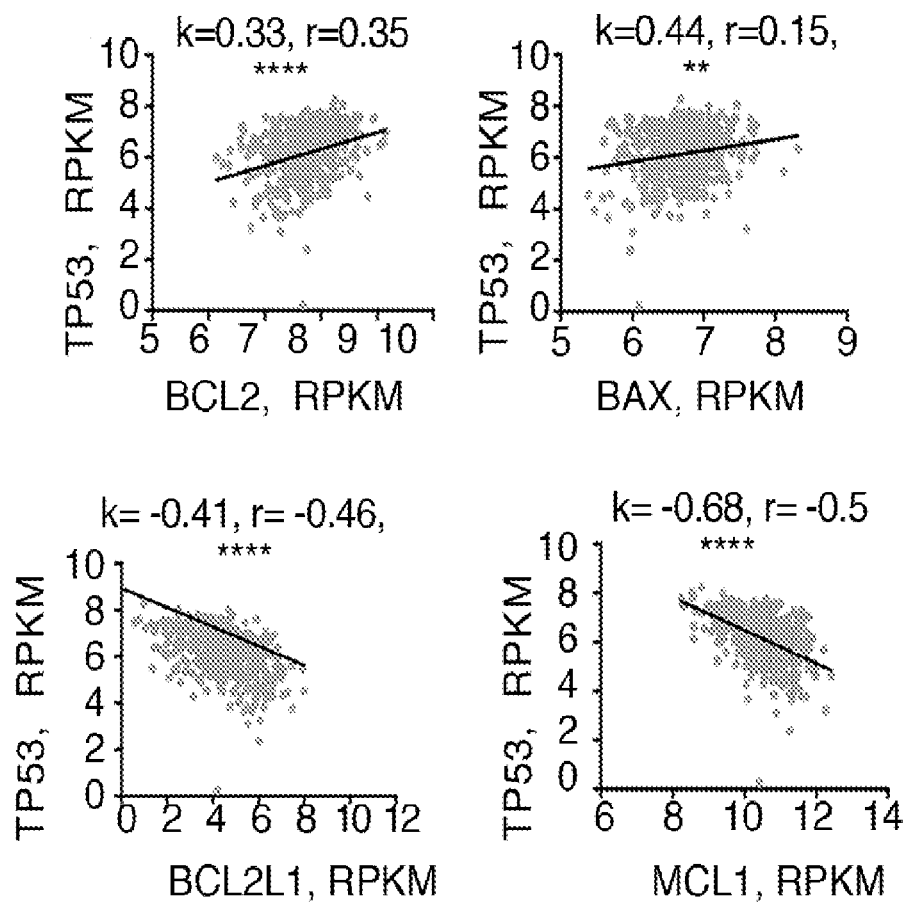
FIG. 2E represents a correlation of TP53 expression with respect to expression of selected genes in an AML patient sample cohort.

To validate the screen hits, we designed several individual sgRNAs to knockout TP53, BAX, PMAIP1, TFDP1 and several other top candidate genes along with non-targeting controls. Analyses of drug sensitivity at 14 days after transduction of MOLM-13 cells with individual sgRNAs revealed a loss of venetoclax sensitivity (FIG. 2A). The top candidates, TP53 and BAX, were also validated by single guide inactivation in an additional cell line, MV4;11 (FIG. 2B) with many $IC_{50}$ values significantly exceeding initial drug concentrations used for the sgRNA screen. These results suggest a general mechanism for venetoclax resistance (FIG. 2C). Analyses of protein levels for the top candidates, BAX, TP53, and PMAIP1 demonstrated significant loss of protein upon single guide RNA inactivation (FIG. 2D and data not shown). Interestingly, while BAX is reported to be a TP53 transcriptional target (reviewed in [34]), its levels remained unchanged when TP53 was inactivated. At the same time protein levels of anti-apoptotic proteins BCL2 and MCL1, were reduced in all four tested TP53 knockout lines, inversely correlating with increased BCL2L1(BCLXL) expression (FIG. 2D). Because BCL2 is a target of venetoclax, a decrease in BCL2 expression in TP53 KO cells provides the simplest mechanistic explanation for the resistance. The inverse correlation of low BCL2/high BCL2L1 expression with null TP53 status is similarly observed in pediatric acute lymphoblastic leukemia [35]. In a large AML patient cohort (Beat AML)[36], BCL2 expression positively correlated with TP53 expression, while both BCL2L1 and MCL1 had inverse correlations with TP53 expression (FIG. 2E).

AML Patient Samples with Mutant TP53 Status or Low Expression Levels of TP53 and BAX have Diminished Sensitivity to Venetoclax Ex Vivo.

Figure 3A:
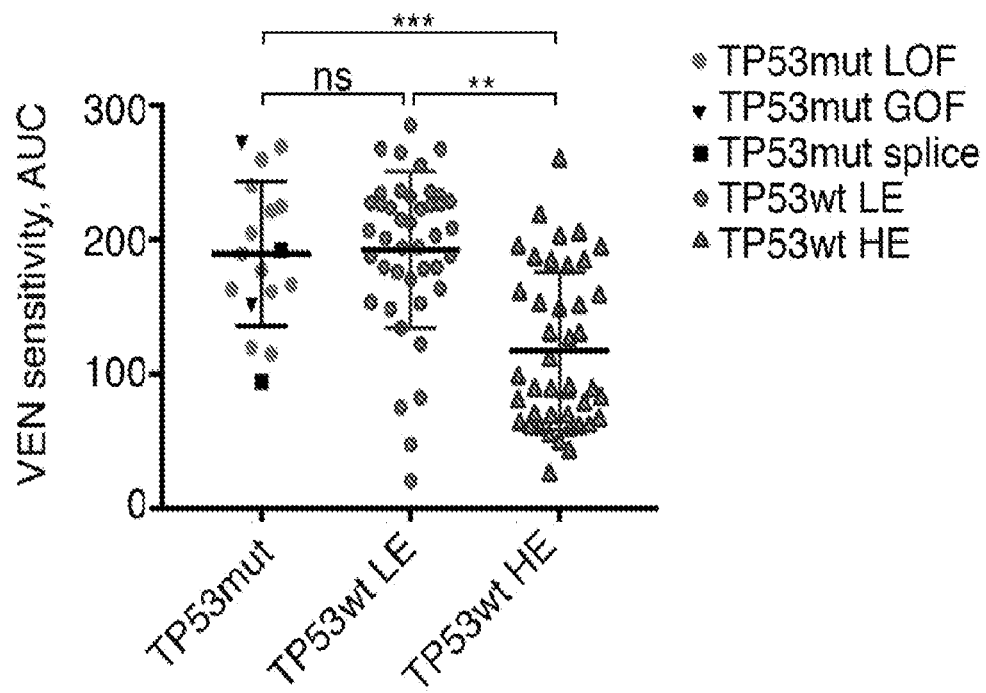
FIG. 3A represents venetoclax (VEN) sensitivity in primary AML patient samples measured in a viability assay across a concentration series ranging from 10 nM to 10 µM.
Figure 3B:
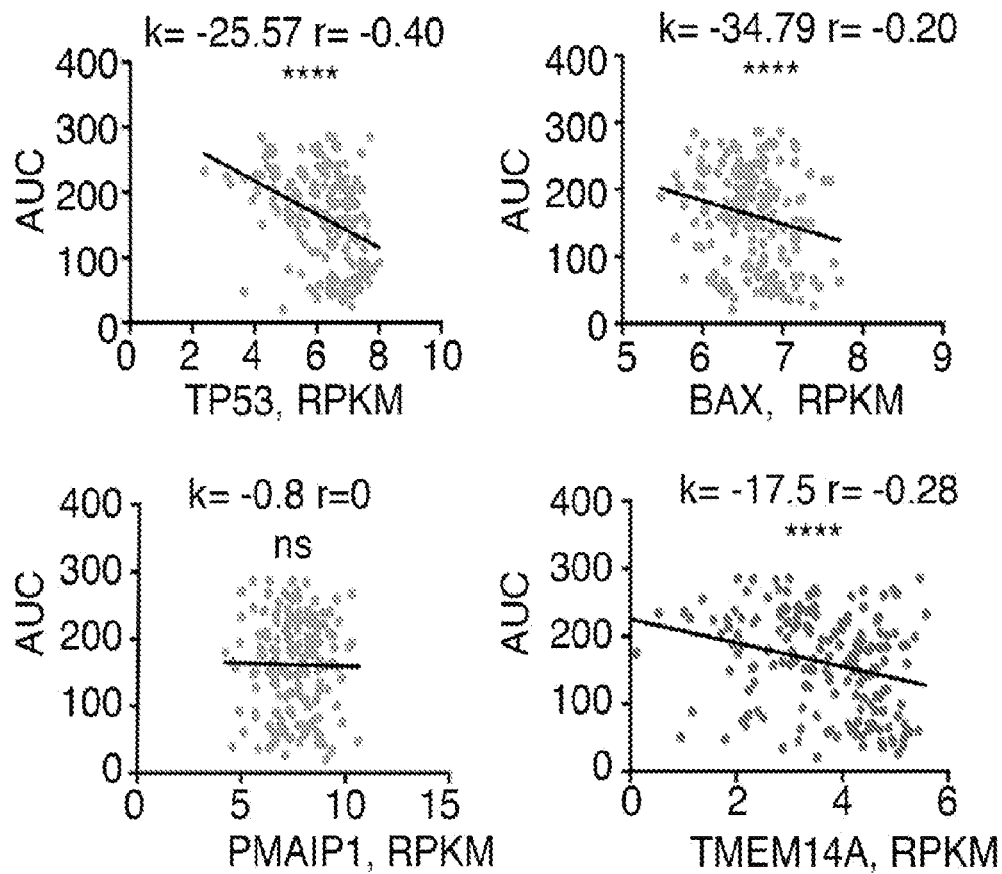
FIG. 3B plots the correlation between gene expression levels from AML patient samples for TP53, BAX, PMAIP1 and TMEM14A to the respective venetoclax sensitivities.

To assess whether the top candidates from the screen have a direct relevance to gene perturbation in AML patients, we analyzed the correlation of venetoclax drug sensitivity with gene expression levels and mutational status using the Beat AML patient sample database [36]. Our analyses indicated that 17 patient samples harboring deleterious TP53 mutations showed a significant loss in drug sensitivity (measured as increases in area under the curve (AUC) in a non-linear modeling of drug response curves) compared with 84 AML patient samples with wild type TP53 (Mann Whitney t-test, p<0.01). Furthermore, when RNA expression was taken into account and the total TP53 wild type cohort was separated into high and low TP53 expression quartile pools; high TP53-expressing cases showed more sensitivity to venetoclax than either TP53 mutant or patients with low, wild type TP53 expression (FIG. 3A). Regardless of TP53 mutational status, both TP53 and BAX expression had a strong inverse correlation with venetoclax sensitivity (high AUC), underscoring the relevance of our CRISPR-derived loss of function candidates to patient-level responses ex vivo (FIG. 3B).

Inactivation of TP53 and BAX Diminishes the Apoptotic Response to Venetoclax.

Figure 4A:
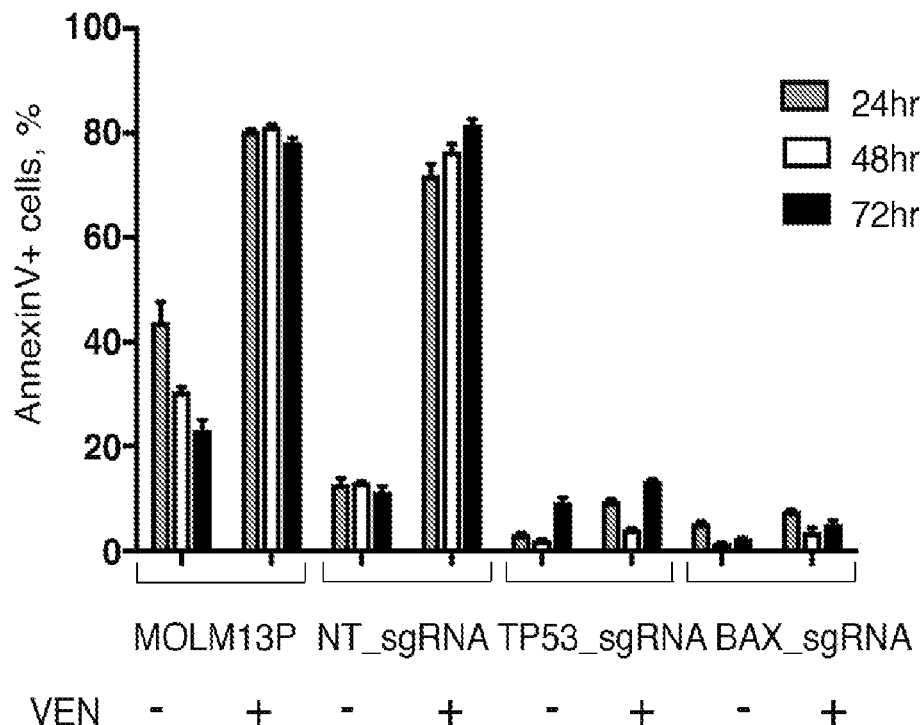
FIG. 4A provides a histogram of sensitivity to venetoclax in MOLM-13 parental cells (MOLM13P) and MOLM13 cells with sgRNA inactivated alleles.
Figure 4B:
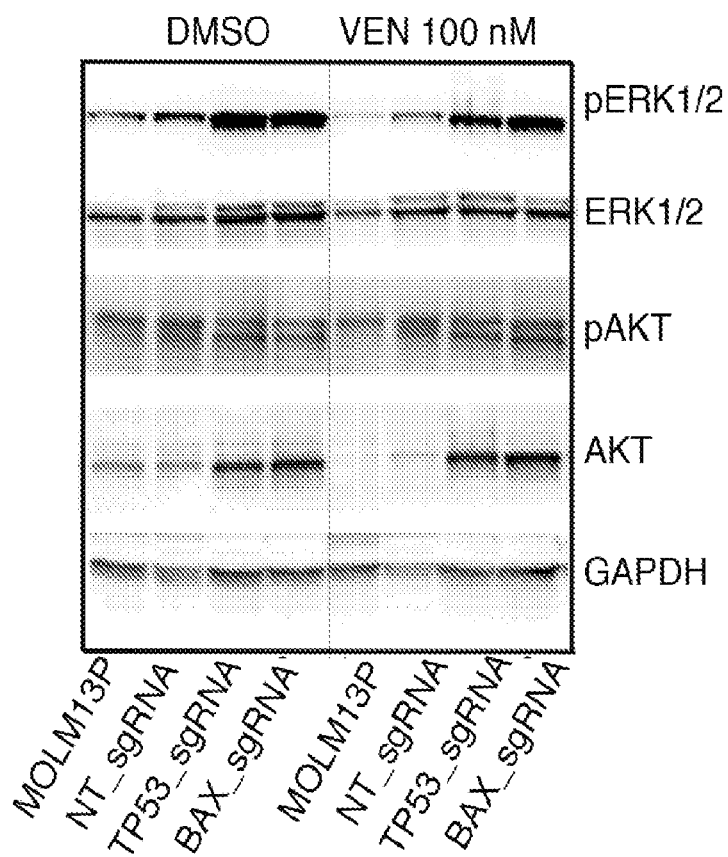
FIG. 4B provides a Western blot analysis of proteins extracted from MOLM-13 parental and MOLM-13 cells transduced with indicated sgRNA/Cas9 viruses and treated overnight with 100 nM venetoclax or vehicle (DMSO), and identified with antisera to phosphorylated ERK1/2 (Thr202/Tyr204, pERK1/2), ERK1/2, phosphorylated AKT (Thr308), AKT, and GAPDH.

To characterize venetoclax sensitivity in MOLM-13 cells with BAX or TP53 KO, we evaluated early markers of apoptosis by measuring the percent of Annexin V positive cells in response to venetoclax treatment (100 nM) [37]. Both TP53 and BAX knockout cells showed a significant decrease in the number of cells undergoing apoptosis (FIG. 4A). This was accompanied by sustained phosphorylation of MAPK1/3 (ERK1/2) during drug treatment and increase in total levels of AKT and MAPK1/3 in cells with inactivation of TP53 and BAX (FIG. 4B).

Resistance to Venetoclax Coincides with Protection from Mitochondrial Stress and Increases in Oxidative Phosphorylation.

Figure 5A:
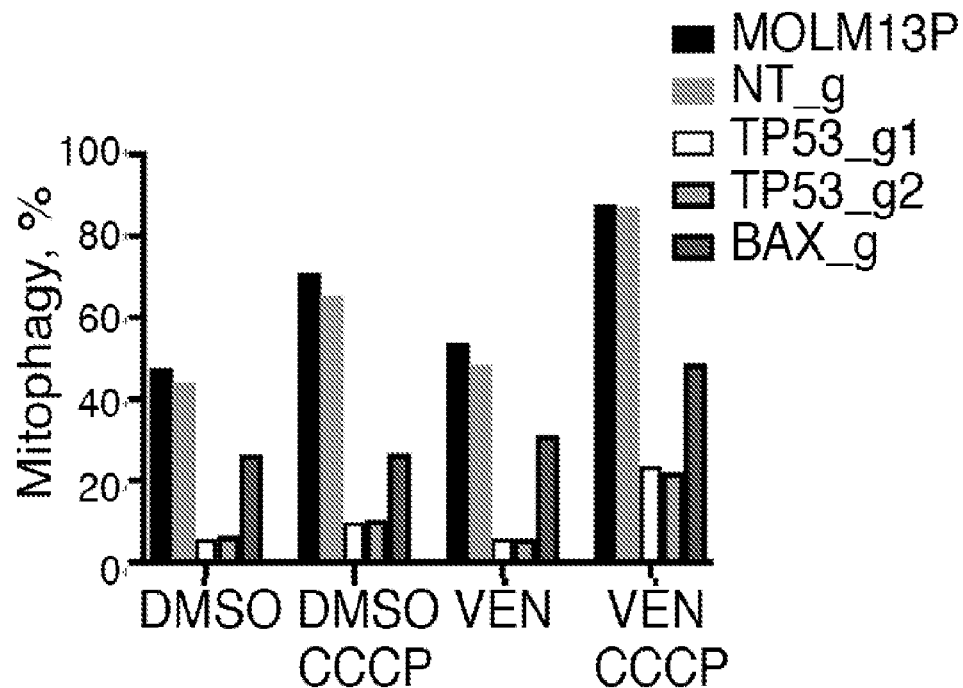
FIG. 5A provides a histogram of a representative mitophagy experiment (n=2).
Figure 5B:
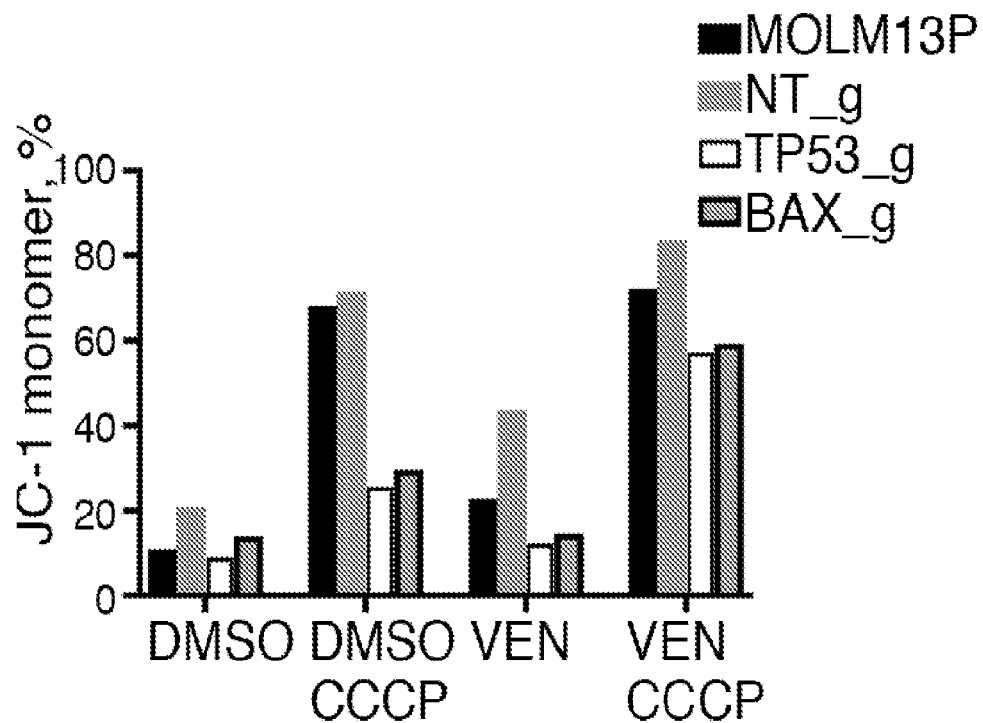
FIG. 5B represents a histogram of a representative experiment from C (n=2).

The top hits from our CRISPR screen pointed toward perturbations in mitochondrial regulators and effectors of the apoptotic program in mitochondria. TP53, BAX, PMAIP1, TFDP1, and BAK function in a pro-apoptotic manner: TP53 acts a sensor of cellular stress and transcriptional regulator of several pro-apoptotic genes; TFDP1 activates and translocates PMAIP1 into mitochondria; PMAIP1 promotes activation of the apoptotic program; and BAX/BAK function as its effectors. Here we observed inactivation of TP53 led to alterations in the expression of anti-apoptotic BCL2 family members (FIG. 2D), that impact mitochondrial homeostasis, response to a variety of stress stimuli and render cells resistant to many other pharmacological agents. These changes prompted us to investigate the impact of overall response to mitochondrial stress in cells briefly exposed to venetoclax (FIG. 5A-B). Cells with inactivation of TP53 and BAX are less likely to undergo mitophagy or mitochondrial death, in response to mitochondrial uncoupler carboyl cyanide m-chlorophenyl hydrazine (CCCP), regardless of venetoclax treatment with more pronounced protection observed in TP53 mutants, suggesting overall changes in mitochondrial homeostasis (FIG. 5A). Additionally, TP53 and BAX mutant cells were less likely to lose mitochondrial membrane potential in response to CCCP alone with venetoclax potentiating the CCCP uncoupling action (FIG. 5B).

Figure 5C:
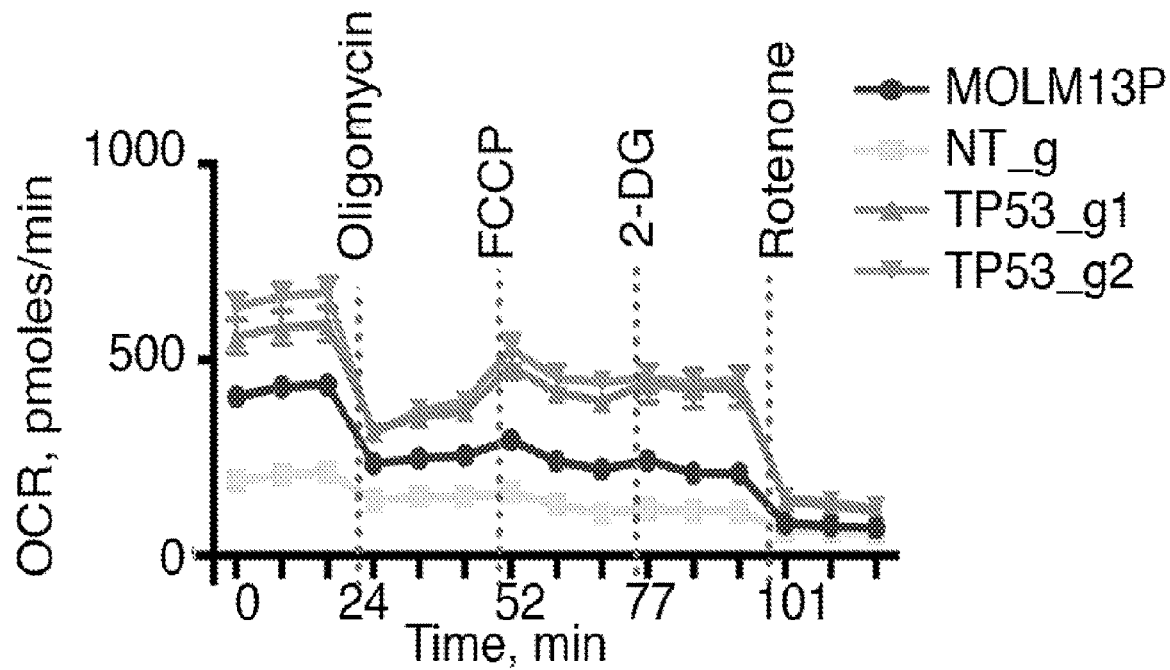
FIG. 5C provides an analysis of oxygen consumption rate (OCR) using Seahorse assay (n=3).
Figure 5D:
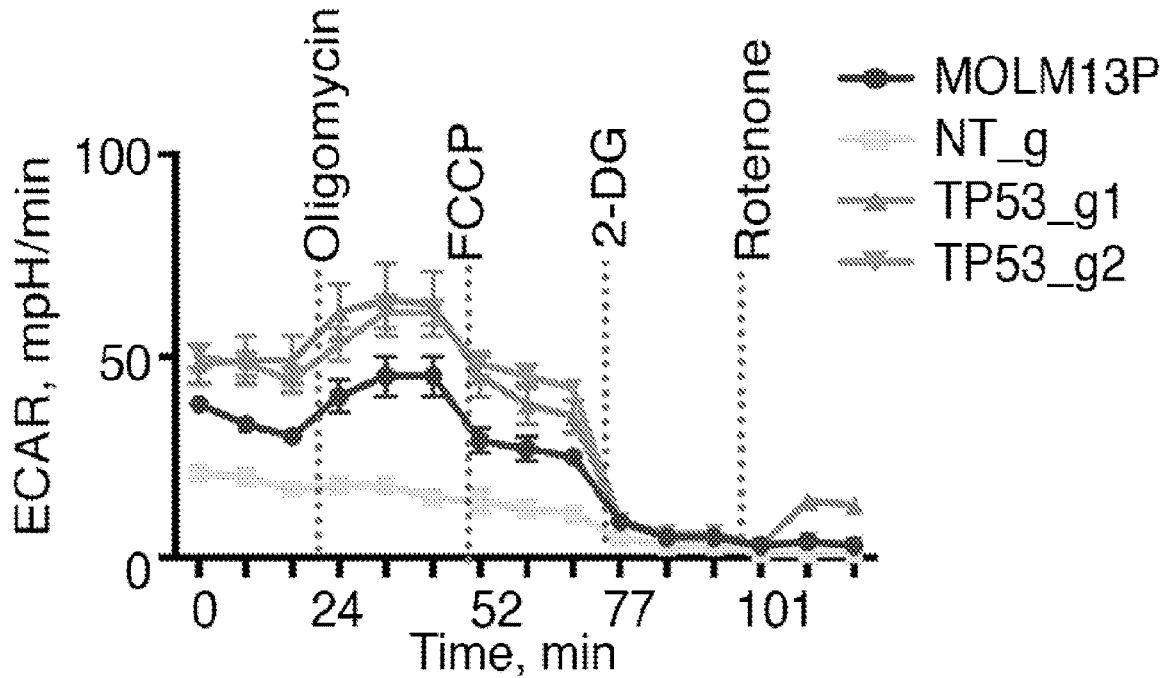
FIG. 5D provides an analysis of extracellular acidification rates (ECAR) using Seahorse assay (n=3).
Figure 5E:
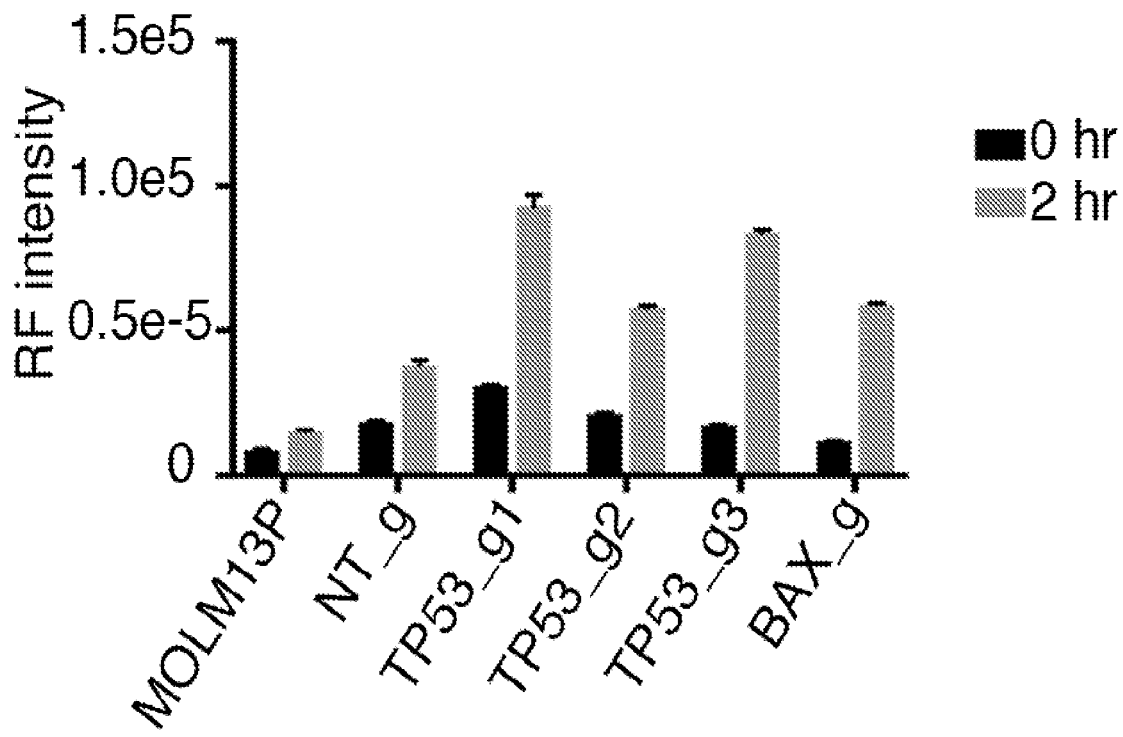
FIG. 5E represents measurement of Reactive Oxygen Species (ROS) using 2',7-dichlorofluorescin diacetate (DC FDA, Abcam) substrate as an indicator of oxidation inside the cell.
Figure 5F:
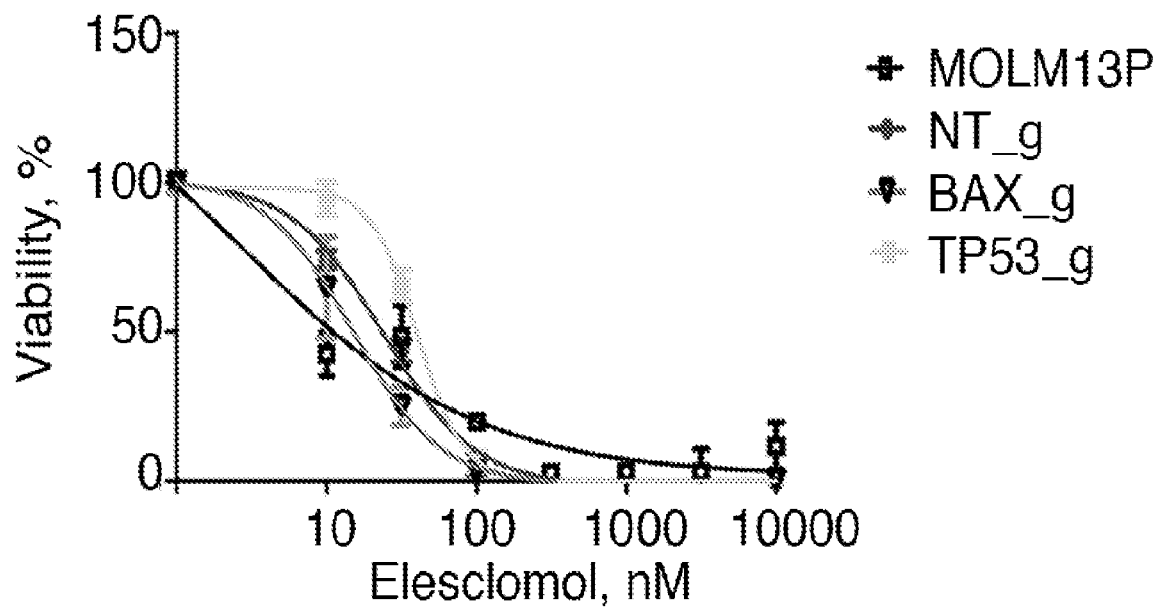
FIG. 5F is a graph of cell viability assay in response to elesclomol.

Venetoclax inhibits BCL2 by mimicking the BH3 binding of apoptotic sensitizers/activators. Both venetoclax and chemical inhibition of BCL2 influence energy production by decreasing oxidative phosphorylation in the mitochondria of leukemia stem cells [38] and can affect various metabolic activities in the cells, including amino acid catabolism [39]. Because TP53 regulates many genes that determine the balance of reactive oxygen species (ROS) production in response to cellular stress [40-42], we evaluated whether oxidative phosphorylation was perturbed in cells inactivated for TP53 by measuring rates of oxygen consumption and electron transport across the mitochondrial membrane. Both outputs were enhanced in mutant cells (FIG. 5C, 5D), accompanied by a moderate increase in cellular ROS (FIG. 5E), as oxidative phosphorylation is a major cellular source of ROS production [43]. Interestingly, both TP53 and BAX KO cells were still susceptible to cell death by elesclomol, a drug that induces cellular death through an increase in cellular oxidation [44], suggesting that apoptosis can still be triggered in venetoclax resistant cells through disruption of mitochondrial homeostasis (FIG. 5F). These results suggest an inhibition of a general mitochondrial stress response coupled with increased cellular respiration.

Perturbations in the Metabolic Profile of Venetoclax Resistant Cells.

Figure 6A:
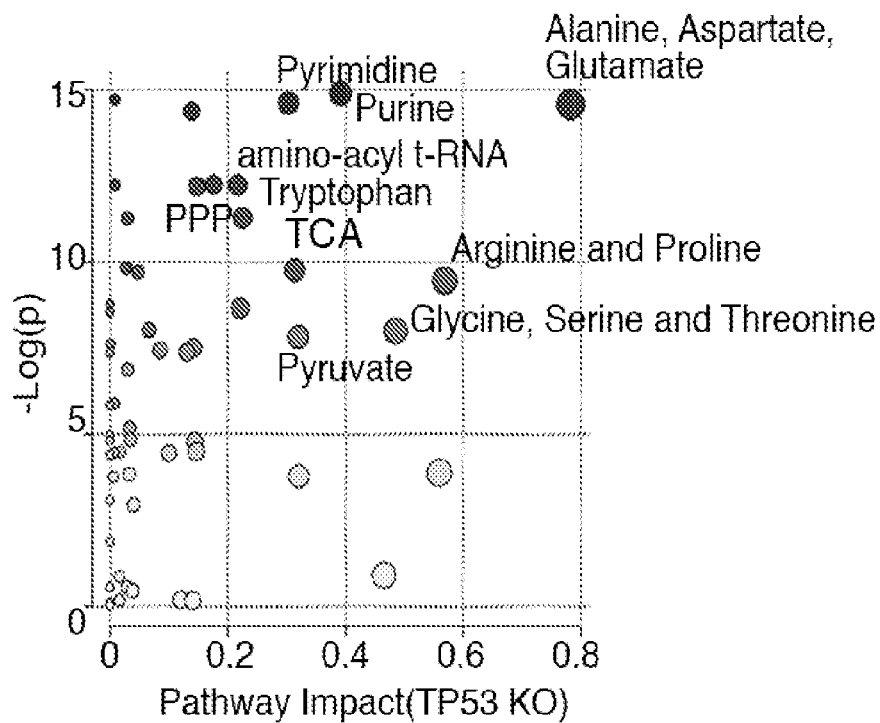
FIG. 6A represents pathway analysis of metabolites with differential abundance dot plot for MOLM13 TP53.
Figure 6B:
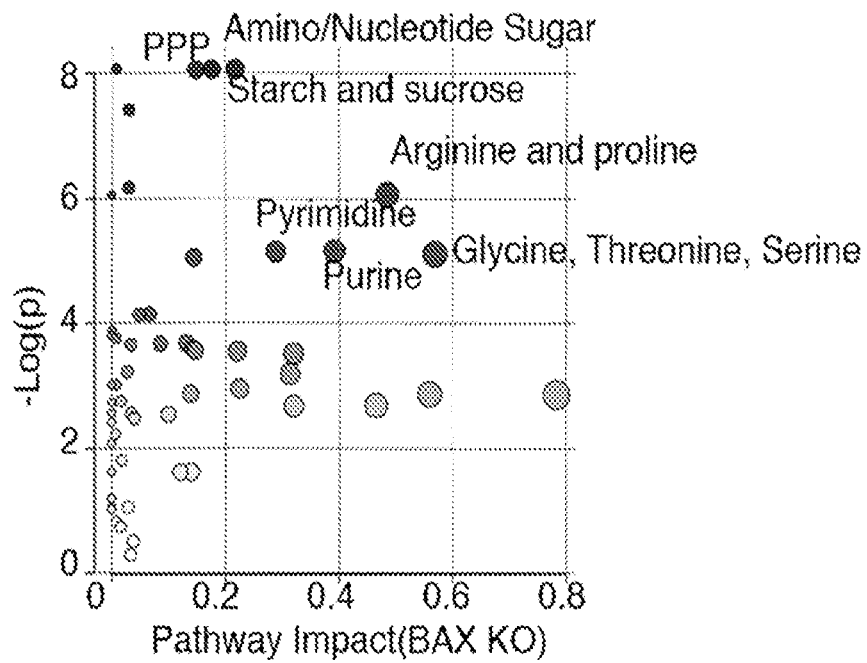
FIG. 6B represents pathway analysis of metabolites with differential abundance dot plot for BAX KO.
Figure 6C:
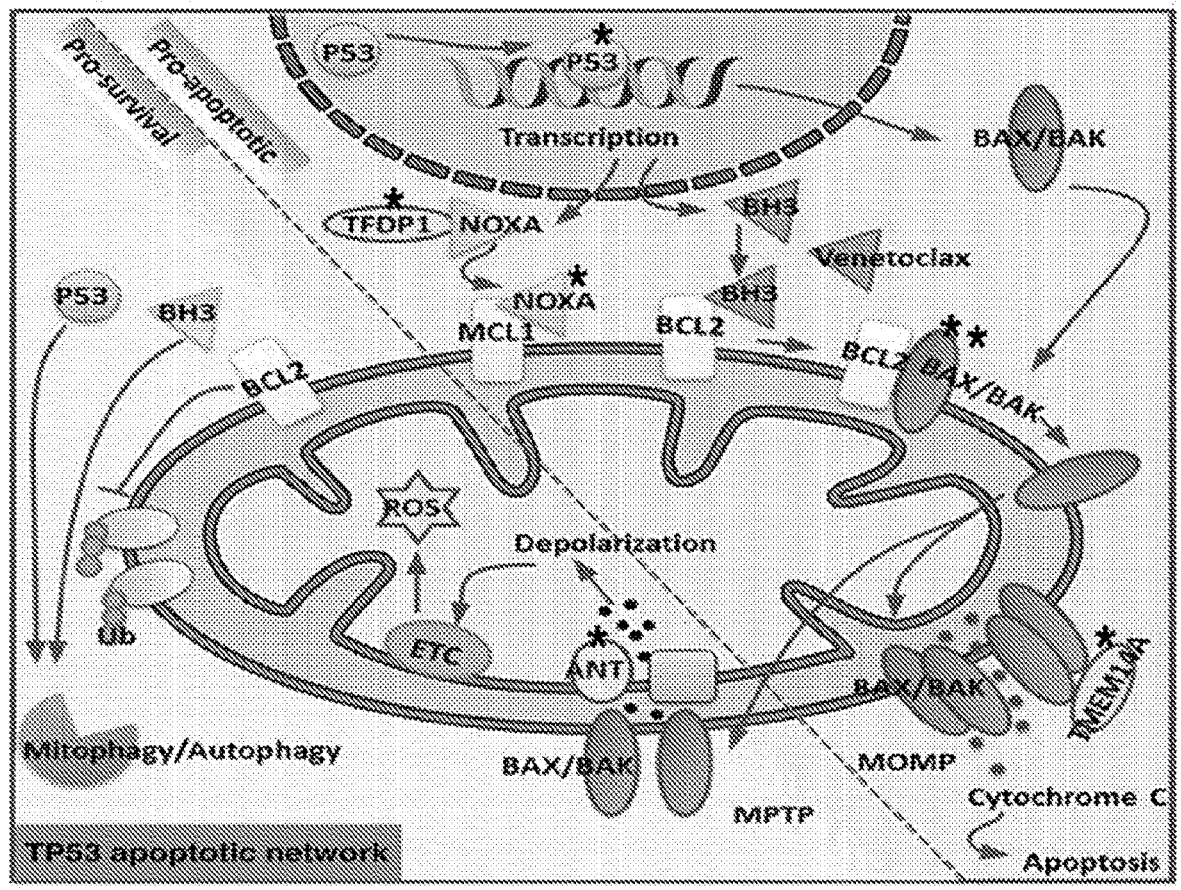
FIG. 6C illustrates a summary of genes identified by the Crispr/Cas9 screen impacting mitochondrial homeostasis, energy production, apoptosis and venetoclax response.
Figure 6D:
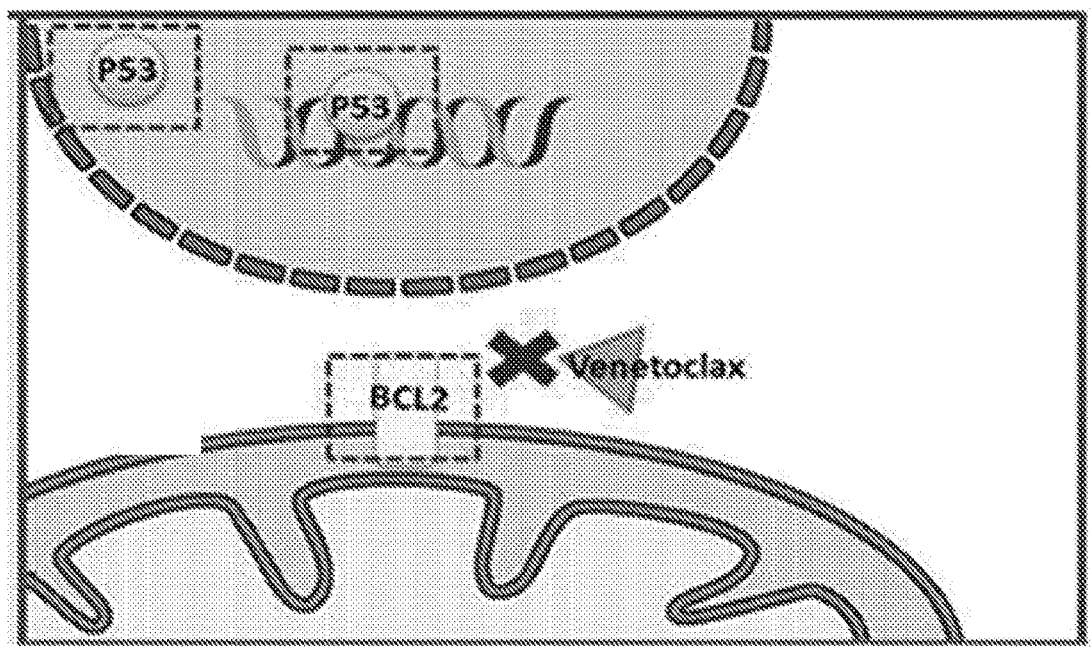
FIG. 6D represents mechanisms of venetoclax resistance in cells with inactivation of TP53.
Figure 9A:
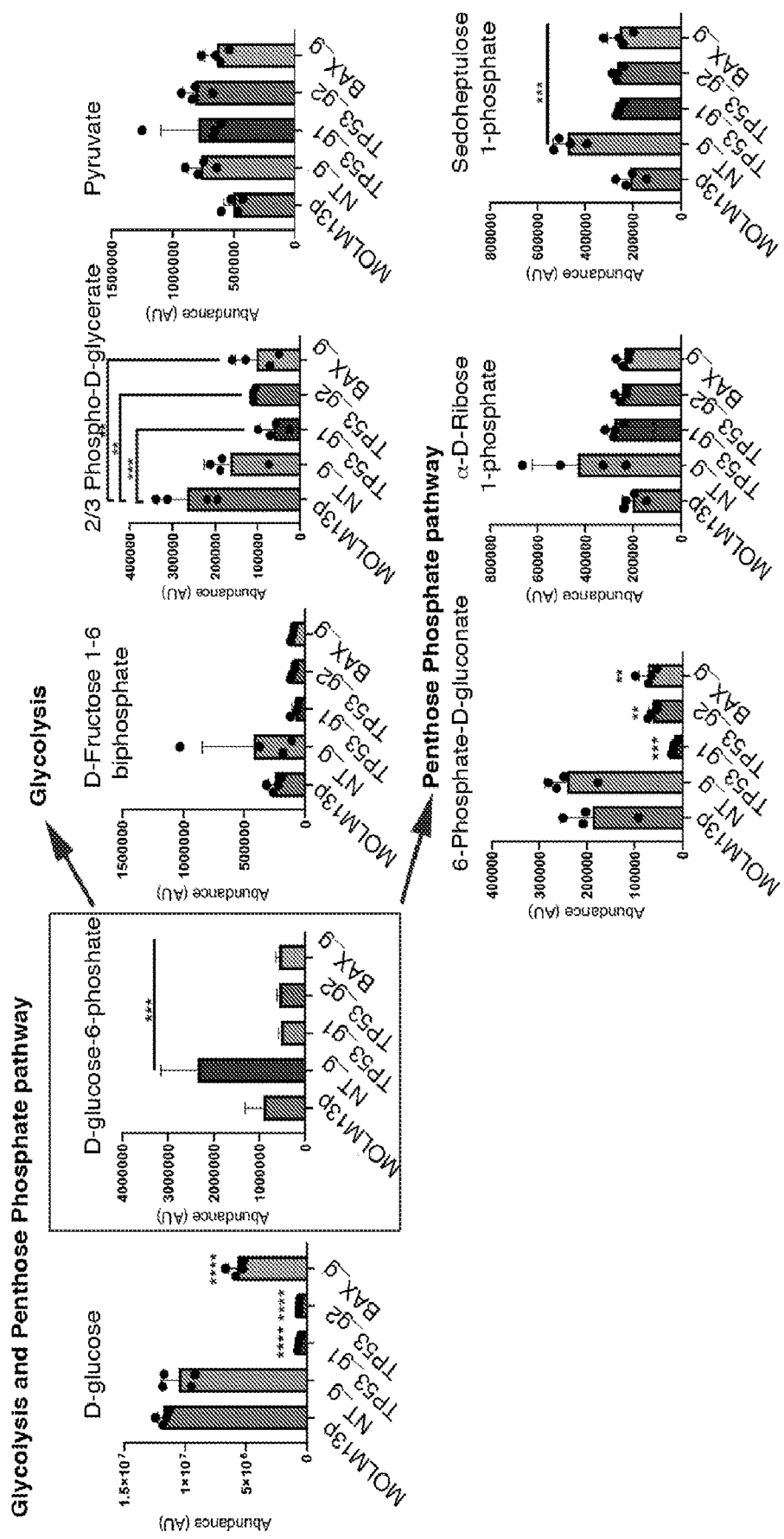
FIG. 9A represents metabolites analyzed for glycolysis and pentose phosphate metabolic pathways for TP53 and BAX KO cells in comparison to non-targeting control.
Figure 13:
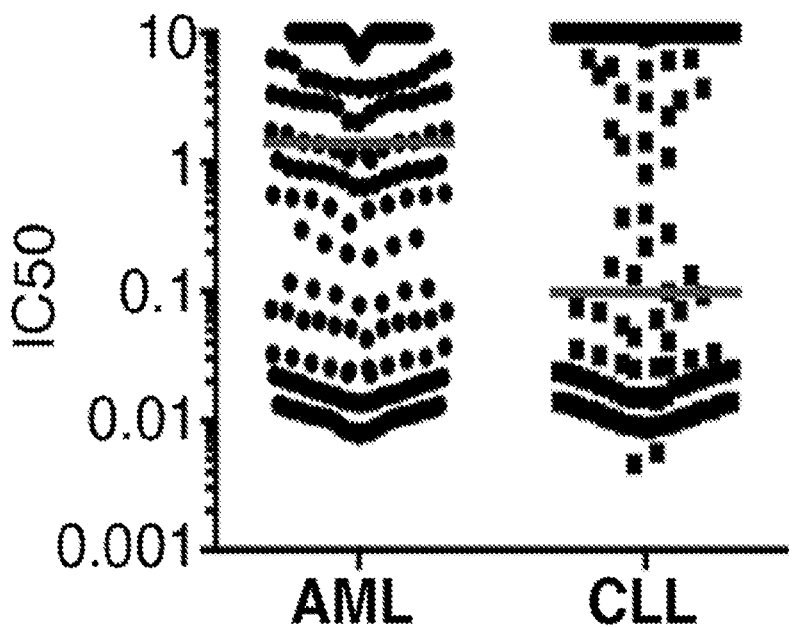
FIG. 13 provides a scatter plot analyses of venetoclax sensitivities in CLL and AML patient cohorts ex vivo.

Unlike the Warburg effect where rapidly proliferating cancer cells in glucose-rich conditions switch to less efficient aerobic glycolysis using the pentose phosphate shunt [43], increased oxygen consumption in TP53 KO cells suggests an increased energy production via anaerobic glycolysis in venetoclax resistant cells. Accordingly, we performed a global metabolomics analysis of MOLM-13 cells with inactivation of TP53, BAX and non-targeting controls. Unexpectedly, we observed a significant decrease in major glycolysis intermediates, such as D-glucose, and D-glucose-6-phosphate; however, levels of pyruvate, the final metabolite entering into the TCA cycle, remained unperturbed (FIGS. 9A and 13). We also observed a decrease in levels of 6-phospho-D-gluconate, but not in subsequent intermediates in the pentose phosphate pathway (Supplementary FIG. 2). Additionally there was a decrease in amino acid levels and urea cycle intermediates (FIG. 6A-B) in both BAX and TP53 mutant cells in comparison to control cells. These reductions were accompanied by increases in nucleotide synthesis, suggesting the utilization of more glucose and amino acids for the purpose of nucleotide synthesis and cellular proliferation (FIGS. 6A, B). These results, together with the diminished sensitivity to venetoclax and perturbations in mitochondrial function, illustrate the significance of our screen hits as depicted in FIG. 6C. From the transcriptional machinery initiated by TP53 in response to cellular stress to various sensitizers such as PMAIP1 and TFDP1 to downstream mitochondrial pore effectors such as BAX, BAK, SLC25A6, TMEM14A, our hits demonstrate the central involvement of mitochondria in conferring venetoclax sensitivity. Resistance is the outcome of alterations in any of these components, for example TP53 affecting BCL2 expression (FIG. 6D) or BAX loss of function affecting mitochondrial outer membrane pore formation (FIG. 6E).

Alteration of Drug Sensitivities in TP53 and BAX KO Cells

Figure 7B:
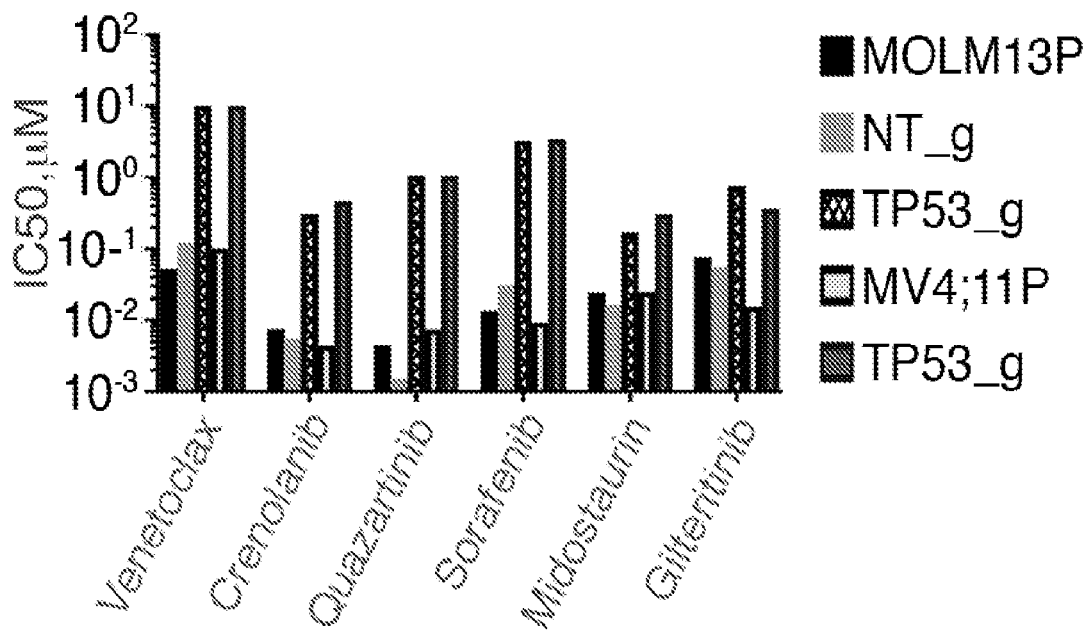
FIG. 7B represents Analyses of FLT3 inhibitor sensitivities, in MOLM-13 and MV4;11 parental and Crispr-modified cells.
Figure 7C:
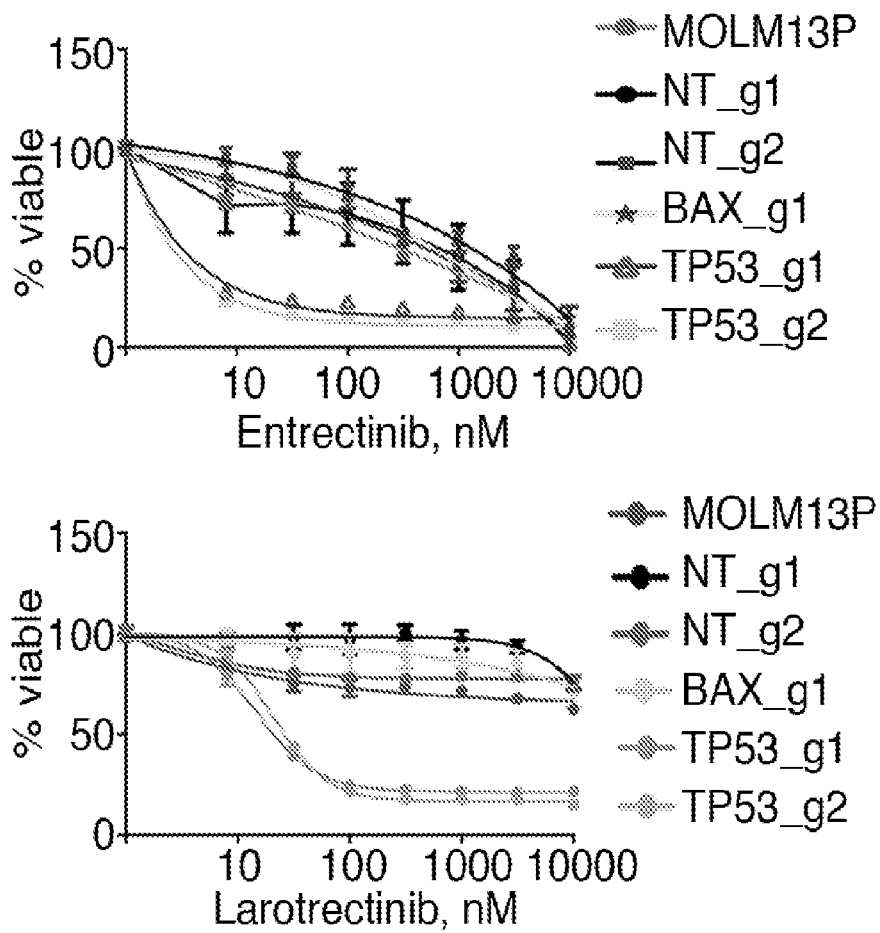
FIG. 7C represents drug sensitivity to NTRK inhibitors entrectinib and larotrectinib, in MOLM-13 cells transduced with indicated sgRNAs/Cas9 viruses.

To evaluate whether the mitochondrial and metabolic changes led to alterations in additional signaling pathways, we evaluated drug sensitivities in MOLM-13 and MV4;11 cells with TP53 and BAX KOs with respect to a venetoclax-resistant MOLM-13 cell line using a panel of a small molecule inhibitors that target a variety of distinct signaling pathways activated in cancers. We observed many significantly changed drug responses, including a core of drug responses that were common to both modified MOLM-13 and MV4;11 cells (FIG. 7A). In addition to loss of venetoclax sensitivities, tyrosine kinase inhibitor sensitivities to the AKT/PI3K pathway (GDC-0941, PI-103), as well as YM-155, an inhibitor of survivin were increased (FIG. 7A). While the BAX KO showed a similar sensitivity to MCL1 inhibitor, AZD5991, relative to control cells, AZD5991 sensitivity was significantly diminished in TP53 KO MOLM13 cells, indicating that these cells do not depend for survival on MCL1. Overall, only four inhibitors showed concordant changes between BAX-inactivated MV4;11 and MOLM-13 cells, including venetoclax, JAK1 inhibitor, aurora kinase inhibitor, H-89, and barasertib. These changes also overlapped in both TP53 inactivated MV4;11 and MOLM-13 cells. Additional changes included the loss of sensitivity to all 6 tested FLT3 inhibitors (crenolanib, sorafenib, sunitinib, quizartinib, midostaurin and gilteritinib) (FIG. 7B). Cells with TP53 KO showed sustained gain of sensitivity to several NTRK/ALK/ROS1 inhibitors, namely, entrectinib [45], crizotinib, GW-2580 and AZD1480 [46] (FIGS. 7A, 7C, 7D, and 10). The role of NTRK1/2/3 receptors (also known as TRKA/B/C) is well documented in the development of the nervous system; NTRK receptors bind neurotrophin ligands and are single transmembrane catalytic receptors with intracellular tyrosine kinase activity. NTRK receptors have recently gained attention for their oncogenic role in a variety of cancer types, occurring as a component of fusion genes [47-50]. NTRK receptor activation is coupled to RAS/MAPK, PI3K or PLC-gamma signaling pathways to promote survival and proliferation [51] [50]. While some NTRK inhibitors have additional targets beyond NTRKs, such as ALK and ROS1 pathways, additional testing with a more selective NTRK inhibitor, larotrectinib, also revealed a profound gain of sensitivity, indicating new dependences on NTRK pathways for cell survival (FIG. 7C, D). Interestingly, among other leukemia cell lines harboring TP53 mutations, such as KG1, THP-1 and HL-60, only KG1 and THP-1 cell lines showed resistance to venetoclax, and KG-1 was also sensitive to all tested NTRK inhibitors (Supplementary FIG. 3, and data not shown). Analyses of NTRK protein levels revealed increases in overall and phosphorylated levels of NTRK proteins in the TP53 loss-of-function setting, and we observed significant decreases in phosphorylation of NTRK and downstream MAPK signaling in response to treatment with entrectinib in TP53 KO MOLM-13, but not in control or parental cells (FIG. 7E). To distinguish NTRK transcripts upregulated in TP53 knockout cells, we tested mRNA expression of NTRK1, 2, and 3 in MOLM-13 and MV4;11 cells with and without deletions of TP53. While NTRK1 and 2 were expressed at low levels, NTRK3 RNA was highly expressed in TP53 KO cells, indicating a transcriptional component of NTRK3 upregulation (FIG. 7F). NTRK1 was expressed at a lower level, albeit higher, in control cells, explaining sensitivity to entrectinib, while in TP53 KO cells the mRNA expression switches to NTRK3. Treatment of TP53 KO cells with entrectinib resulted in G1 cell cycle blockade (FIGS. 11A-B), and treatment of these cells with entrectinib and venetoclax together was effective in both the parental and TP53 KO cell lines but not synergistic relative to each single agent (FIG. 11C). Analysis of RNA levels obtained from AML patient samples revealed a significant increase in NTRK1 transcripts in TP53 mutant versus wild type cases (FIG. 7G). In AML patients harboring TP53 mutations from the Beat AML cohort, several specimens showed inverse sensitivity ex vivo between venetoclax and entrectinib, and additionally showed a trend towards increased sensitivities to other agents affecting NTRK/ALK/ROS1 pathways (FIG. 12). Together, these data have identified a mechanism of venetoclax resistance in AML, namely, the TP53 apoptosis machinery, and demonstrated an approach to identify and validate candidate genes in drug resistance. In addition, our data suggest a dependency on new survival pathways (e.g. NTRK) in TP53 mutant cells. Cells resistant to venetoclax had perturbed mitochondrial homeostasis and were abnormally protective in responses to various mitochondrial stress and exhibit significant metabolic differences, indicative of high proliferation rates, energy production and DNA synthesis.

DISCUSSION

The clinical experience of venetoclax therapy for CLL, has shown durable responses in the majority of patients (79%), with complete response in 20% of the patients [52]. Venetoclax monotherapy has shown limited success in AML clinical trials as a single agent due to drug resistance in the majority of patients [20]. Both of these clinical results are mirrored in venetoclax sensitivity observed ex vivo in patient samples assayed in the Beat AML cohort [36], where we observed significantly greater activity of venetoclax on CLL than on AML patient specimens, with a median $IC_{50}$ for AML 14 times higher than that for CLL, while about 40% of AML and 55% of CLL exhibit sensitivity to venetoclax with $IC_{50} \geq 0.5$ µM (FIG. 13). The clinical activity of venetoclax in newly diagnosed AML patients, when administered in combination with azacytidine has been more robust [21, 53], and this combination as well as other venetoclax combinations are likely to see broader use in AML and in CLL, prompting a need to better understand possible mechanisms of resistance. Our findings identify genes affecting control and execution of apoptosis in mitochondria, TP53, BAX, and PMAIP1, and their inactivation as a single gene in establishing venetoclax resistance in AML patient derived cell lines. These results correlate with a recent study reporting activation of TP53 through inhibition of MDM2 overcomes venetoclax-resistance in AML cell lines [27]. The mechanism of venetoclax action is centered on the mitochondria, a center of energy production through cellular respiration as well as initiation of apoptosis. Its target, BCL2, functions in both cell survival and oxidative phosphorylation process. In many ways, homeostasis of mitochondria and cell survival in apoptosis are tightly linked. To attest to that point, venetoclax resistant cells show both: likely resistance through changes in expression of prosurvival proteins and perturbation in mitochondrial stress sensitivities.

Loss of TP53 Affects Sensitivity to Other Signaling Pathway Inhibitors.

Loss of TP53 affected drug sensitivities to a wide range of small molecules, including FLT3 inhibitors. While many tyrosine kinase inhibitors have multiple targets, making it difficult to dissect sensitivity change unless a group of related inhibitors is affected. For example, a previous study of relapsed/refractory AML patients with newly acquired crenolanib resistance identified TP53 mutations as being strongly associated with resistance (H. Zhang, personal communication). Our results expand on that finding, and include loss of sensitivity changes for most of the existing FLT3 inhibitors, an observation that is likely due to disruption of the normal apoptotic response in TP53 mutant cells. Additionally, we observed a new stronger dependency on NTRK pathway, confirmed by similar increased in sensitivity in several inhibitors, either affecting NTRK/ALK/ROS1 signaling such as entrectinib, or NTRK exclusive inhibitor, larotrectinib. TP53 mutations in AML are typically rare (<8% of all cases), however, a dysfunctional wild type TP53 is much more common and requires functional assessment of TP53. In general TP53 mutations have poor prognosis and have dampened responses to a variety of small molecule therapeutic applications. Our future studies will test sensitivity to NTRK inhibitors in xenograft studies.

Genome-Wide Screen Identified Genes Controlling Pro-Apoptotic Responses and Mitochondria Functions.

Our screen identified genes whose inactivation confers venetoclax resistance. The most significant hits have a similar mode of action in apoptosis, namely a strong pro-apoptotic activity. These included TP53, a transcription factor with both activating and repressing functions controlling many aspects of cellular responses, including genotoxic stress pertinent to apoptotic signaling [34, 54, 55]. We found changes in genes expression of several TP53-regulated genes changed in our TP53 KO MOLM-13 cells, including downregulation of BCL2, MCL1, and significant upregulation of BCL2L1, without notable changes to BAX expression. With the exception of MCL1, the upregulation of BCL2L1 and downregulation of BCL2 correlate well with expression levels of TP53 in a large AML cohort [36] as well as in pediatric acute lymphoblastic leukemia [35]. Downregulation of BCL2 in TP53 KO MOLM-13 cells offers a mechanistic insight into venetoclax resistance. In addition to TP53, our screen identified pro-apoptotic proteins, BAX, BAK1/BAK and PMAIP1, which are known TP53 transcriptional targets and are critical for MOMP formation in apoptosis (BAX/BAK) and sensitizing and inhibiting anti-apoptotic MCL1 (PMAIP1); TFDP1, which, together with E2F1, is involved in activation and translocation of PMAIP1 into mitochondria [56]; and SLC25A6 (ANT3), a nucleotide ADP/ATP translocase which is involved in permeability transition core complex (PTCP) formation important for mitochondria depolarization process in mitophagy and accompanies apoptosis process during cytochrome C release [57-59] (FIG. 6C).

Venetoclax induced membrane depolarization in control cells (FIG. 5), and showed synergy with CCCP in mutant cells, suggesting that it is part of its mechanism of action. In fact, we found that mitochondria in venetoclax resistant cells show different response to mitochondrial stress and both TP53 and BAX mutant cells showed decreased mitophagy response and membrane depolarization protection.

Metabolic Changes in Venetoclax Resistant Cells Likely Reflect an Increased Proliferation Rate in TP53 and BAX KO Cells with Defective Apoptosis.

Metabolic profiling of our mutant cells further indicated changes in energy utilization. Perturbations in the metabolism of cancer cells have been long recognized; for example, some cancer cells rely on glycolysis and pentose phosphate pathways versus cellular respiration, known as the Warburg effect [43]. This phenomenon is directed toward utilization of carbon sources for nucleotides, fatty acid and protein synthesis required for cellular proliferation. While MOLM-13 cells are leukemia derived with a cancer metabolism, inactivation of TP53 and BAX further exacerbated metabolic changes: increased cellular proliferation led to a diversion of resources into production of nucleotides, fatty acids and proteins required for membrane production. Curiously, this was accompanied with increased cellular respiration/increase in ROS production relative to parental cells, suggesting that mitochondria are overcompensating for the glycolysis intermediates shunting into the pentose phosphate pathway. Similar metabolic changes, accompanied by increased oxidative phosphorylation as a result of TP53 inactivation were previously observed in other tissues [60]. It is possible that TP53 inactivation also has a transcriptional impact on the observed metabolic changes, since it is known to negatively control glycolysis through the induction of TIGAR expression [40], which degrades fructose-2,6-bisphosphate and opposes the Warburg effect. Several other changes in metabolic profile, namely significant increases or decrease in several amino acids (variable between TP53 and BAX mutant cells), and urea cycle intermediates (common to both TP53 and BAX mutant cells), suggest the presence of other catabolic shunts to provide carbon sources for amino adds necessary for new cell production.

Clinically Relevant Hits are Identified with BeatAML Database.

Identification of a significant collection of apoptosis and mitochondria homeostasis controlling genes in our genome-wide screen for venetoclax resistance validated our top hit findings; however, while providing mechanistic insight, some validated hits do not correlate with available patient sample data. For example, we did not find a correlation between low PMAIP1 expression and low venetoclax sensitivity in our AML patient cohort, nor were mutations in PMAIP1 associated with loss of venetoclax sensitivity, underlying the importance of leveraging an independent patient data resource to refine clinically relevant hits from a genome-wide screen. While we focused on the loss of function of genes conferring venetoclax resistance, our screen predicts that gain-of-function mutations in pro-survival genes in the apoptotic cascade will also result in resistance to venetoclax. Interestingly, in a companion study by Chen, Glytsou and colleagues, where the focus of investigation was on a discovery of venetoclax-sensitizing genes (ref), loss of function in genes pertinent to mitochondrial functions was also observed. Further analysis of the venetoclax-sensitizing genes in this companion study uncovered impacts on mitochondrial function and metabolic pathways that were opposite of the impacts observed with venetoclax-resistance genes here. Collectively, these data suggest that mitochondrial function and specific metabolic pathways are essential in governing both sensitization and resistance to venetoclax.

Methods

Cell lines: Human MOLM-13 cells were obtained from the Sanger Institute Cancer Cell Line Panel. Human MV4; 11, KG1 and THP-1, GDM1 were obtained from ATCC. Cell lines were maintained in 15% FBS, RPMI, supplemented with glutamine, penicillin/streptomycin and anti-mycotic reagent, and tested regularly for *mycoplasma*-free growth. Authentication was performed on all cell lines used in this study.

Lentivirus Generation and Transduction.

Lentivirus was generated using 293T/17 cells as a source of viral production and psPax2 (Addgene, #242585). Lentiviruses were generated in a BSL2 facility using either single transfer vectors or libraries in combination with packaging psPax2 (Addgene, #242585) and VSVG (Invitrogen) plasmids. The following lentiviral transfer vectors were obtained from Addgene: PKLV2-EfF1a-Cas9BIst-W (#324979), pKLV2-U6g RNA5(Empty)-PG KmCherry2AGFP-W (#362132), pKLV2-U6gRNA5 (gGFP)-PGKmCherry2AGFP-W (#362132,) lentiCrisprV2 (#242585). Viruses with single transfer vectors were generated using transfection with lipofectamine-2000 (Invitrogen) following the manufacturer's suggested protocols. Viral supernatants were used directly for spinoculation in a 1:1 mixture with growth media and $3\times10^6$ cells per condition in the presence of 100 mM Hepes and 8 mg/ml Polybrene (Santa Cruz). Centrifugation was carried out at 2500 RPM for 2 hrs at 30° C. Viruses for sgRNA libraries were produced as described [61], and concentrated; titers were determined using qPCR viral titration kit (ABM). Titered virus was used to transduce $1\times10^8$ cells at a targeted multiplicity of infection (MOI) of 0.3 using spinoculation as described above, with $4\times10^6$ cells per well in a 6-well dish. Infected cells from either library or single guide RNAs were selected with appropriate antibiotics, (puromycin, 2 µg/ml or blasticidin, 10 µg/ml), for 5-7 days to achieve stable integration.

Crispr/Cas9 Screen.

Loss-of-function screens were performed using two human genome-wide sgRNA libraries, Y. Kosuke library [28] and Brunello library [30], both purchased form Addgene, (#73179 and #67989, respectively). The Brunello library screen, delivering both Cas9 and sgRNA in one vector was carried out as described (Shalem, et al, 2016), while Y. Kosuke library screen required the prior generation of Cas9-expressing MOLM-13 cells. These cells were generated by transduction with lentivirus carrying Cas9:Blst genes, followed by transduction with the sgRNA library as described [28]. Briefly, $1.5\times10^8$ cells were transduced at an MOI of 0.3 to ensure single entry and selected for puromycin for stable integration for 5-7 days. $5\times10^6$ cells were collected for initial quality assessment. Transduced cells were further grown to $1.2\times10^8$, followed by exposure to drug treatment (1 µM Venetoclax in DMSO or vehicle alone). Cells were collected at days 0, 7, 14 and 21 days for analyses post puromycin selection. Genomic DNA was extracted at each point and PCR libraries were generated using a 2-step PCR for Brunello libraries [61] or a one-step PCR for Y. Kosuke libraries [28] to attach Illumina barcodes and primers. Pooled libraries were subjected to Illumina deep sequencing and enriched or depleted sgRNAs were detected in both venetoclax-treated or control (DMSO only) samples. Single guides tested in validation studies are listed in Supplementary Table 8.

CRISPR Libraries Biostatistical Analysis.

Pipeline for executing analyses of CRISPR libraries sequences were performed using modified Mageck analyses [29]. Adaptor sequences were removed using cutadapt [62] and reads were aligned to the K. Yusa library using bowtie2 [63]. Exact match was required during alignment and sequences that aligned to more than 1 region were discarded. An overall alignment rate of 92% was achieved. Read counts were normalized using the 1) median ratio method for K. Yusa library screen and 1) median and control normalization for the Brunello library screen. (doi: https://doi.org/10.1126/science.1246981, https://doi.org/R106-10.1186/qb-2010-11-10-r106); further, mean-variance was performed and individual sgRNAs were ranked as described in Li et al [29, 64]. Robust rank aggregation gene-level p-values were also calculated to produce a 2-D screen results overview (FIG. 1D and FIG. 1E). Snakemake was used to design and execute the workflow [65]. Tests were performed comparing DMSO day 7, 14, and 21 to day 0 respectively, and venetoclax screen at day 14 to DMSO screen at day 14. Sequencing data is deposited at GDC.

Annexin V Staining.

MOLM-13, including parental, Non-Targeting (NT) control, TP53 KO, or BAX KO were plated in T25 $cm^2$ cell culture flasks at $2\times10^5$ cells/mL in 5 mL of growth media with and without venetoclax at a final concentration of 50 nM. Cells ($1\times10^5$) were sampled at 24, 48 and 72 hours by staining with Pacific Blue™ Annexin V (Biolegend) and Propidium Iodine to distinguish dead cells according to the manufacturer's protocol. All tests were performed in duplicate. Sample acquisition was conducted using a BD FACS Aria™ III on 10,000 acquired events. The data were analyzed post acquisition using FlowJo software (Tree Star, Ashland, Oreg., USA).

Immunoblot Analysis.

Whole cells extracts from MOLM-13 or MV4;11 cells were prepared using 20 mM Tris-HCl (pH 7.5), 150 mM NaCl, 1 mM Na EDTA, 1 mM EGTA, 1% Triton, 2.5 mM sodium pyrophosphate, 1 mM beta-glycerophosphate, 1 mM $Na_3VO_4$, 1 µg/ml leupeptin (Cell Signalling), 1 mM PMSF, proteasome (Roche) and phosphatase inhibitor cocktail (Sigma-Aldrich). Proteins were resolved on 5-15% gradient gels (Biorad), transferred to PVDF membrane (Amersham) and subjected to immunoblotting using primary, followed by corresponding HRP-conjugated secondary antibodies (Promega), or biotinylated secondary antibody followed by streptavidin conjugated to HRP(TRK antibodies). Primary antibodies used for this study were obtained from Cell Signalling, p44/42 MAPK (ERK1/2) (#9102), phospho ERK1/2(Phospho-p44/42 MAPK (Thr202/Tyr204, #4376), total anti-TP53 (#2524), anti-MCL1(#5453), anti-BAX (#2772), anti-BCL2 (#2872), anti-BCL2L1 (#2764), anti-pan TRK (#92991); Abcam, anti phospho TRK (#ab197071); ThermoFisher Scientific, anti-GAPDH, (#AM4300). Antibodies were used at dilutions suggested by the manufacturer.

Ex Vivo Functional Screen.

Small-molecule inhibitors, purchased from LC Laboratories (Woburn, Mass., USA) and Selleck Chemicals (Houston, Tex., USA), were reconstituted in DMSO and stored at −80° C. Inc. Inhibitors were distributed into 384-well plates prepared with a single agent/well in a 7-point concentration series ranging from 10 µM to 0.04 µM for each drug. The final concentration of DMSO was ≤1.1% in all wells. Cells were seeded into 384-well assay plates at 1,000 cells/well in RPMI-1640 media supplemented with fetal bovine serum (15%), L-glutamine, penicillin-streptomycin and antimycotic. After three days of culture at 37° C. in 5% $CO_2$, MTS reagent (CellTiter96 AQueous One; Promega Madison, Wis., USA) was added, optical density was measured at 490 nm, raw absorbance values were adjusted to a reference blank value, and then used to determine cell viability (normalized to untreated control wells). Prizm software(GraphPad) was used to perform non-linear regression analyses on normalized values for the determination of IC50.

Seahorse Metabolic Assay.

Oxygen consumption rates of intact cells were measured using an XF24 Extracellular Flux Analyzer (Seahorse Bioscience). XF24 Cell Culture Microplates (Seahorse Bioscience) were coated with Cell-Tak Cell and Tissue Adhesive (Thermo-Fisher), and seeded with $2\times10^5$ MOLM-13 cells per well. The plates were centrifuged to allow cells to adhere, placed in an incubator not supplemented with $CO_2$ for 30 min, and subsequently analyzed on the XF24 Analyzer.

Metabolomic Analysis.

Two million MOLM-13 and MV4;11 cells were flash frozen as cell pellet and metabolomics analyses were performed via ultra-high pressure-liquid chromatography-mass spectrometry (UHPLC-MS—Vanquish and Q Exactive, Thermo Fisher) as previously reported [66]. Briefly, cells were extracted in ice cold methanol:acetonitrile:water (5:3:2 v/v) at a concentration of 2 million cells/mL of buffer. After vortexing for 30 min at 4° C., samples were centrifuged at 12,000 g for 10 min at 4° C. and supernatants processed for metabolomics analyses. Ten microliters of sample extracts were loaded onto a Kinetex XB-C18 column (150×2.1 mm i.d., 1.7 µm—Phenomenex). A 5 min gradient (5-95% B, phase A: water+0.1% formic acid and phase B: acetonitrile with +0.1% formic acid for positive ion mode; 0-100% B, phase A: 5% acetonitrile+5 mM ammonium acetate and phase B: 95% acetonitrile+5 mM ammonium acetate for negative ion mode) were used to elute metabolites. The mass spectrometer scanned in Full MS mode at 70,000 resolution in the 65-975 m/z range, 4 kV spray voltage, 45 sheath gas and 15 auxiliary gas, operated in negative and then positive ion mode (separate runs). Metabolite assignment was performed against an in-house standard library, as reported [66]. Pathway analysis of median-normalized metabolites was determined using Metaboanalyst 4.0

Mitophagy Detection.

Cells were loaded in complete medium with 100 nM mitophagy Dye (Mitophagy Detection Kit, Dojindo Molecular Technologies) and 25 nM MitoTracker Deep Red, incubated for 30 min at 37° C. with serum free RPMI, washed and treated with DMSO or 100 nM venetoclax in DMSO for 2 hrs. Cells were washed with medium once, resuspended with RPMI with 10% FBS with or without 20 µM carboyl cyanide m-chlorophenyl hydrazine (CCCP), a mitochondria uncoupler to induce mitophagy for 24 hrs. Cells were washed, loaded with lyso dye for 30 min and observed for fluorescence. Mitophagy was detected as intense fluorescence of mitodye upon fusion with lysosomes, detected with lyso dye (488 nm(Ex), 550 nm(Em). 10,000 cells were collected for analysis using a BD FACS Arian™III on 10,000 acquired events. The data were analyzed post acquisition using FlowJo software (Tree Star, Ashland, Oreg., USA). 10,000 cells were acquired using channels 405-2-A (lyso dye), 561-3-A(Mitophagy dye) and 640-1-A(MitoTracker Dye).

Mitochondrial Membrane Potential.

Mitochondrial membrane potential (MMP) was assessed using tetramethylrhodamine methyl ester (TMRME) bound to JC-1 (Dojingo Molecular Technology), and allowing JC-1 to change its fluorescence from as red fluorescent as a polymer in healthy mitochondria into green fluorescent monomer in depolarized mitochondria according to manufacture suggested protocol. Membrane depolarization was induced with CCCP. Cells were treated with 100 nM venetoclax or DMSO and with or without CCCP for 2 hrs prior to addition of the dye and flow cytometry.

REFERENCES

1. Hanahan et al., *Hallmarks of cancer: the next generation*. Cell, 2011. 144(5): p. 646-74.
2. Llambi, F. and D. R. Green, *Apoptosis and oncogenesis: give and take in the BCL-2 family*. Curr Opin Genet Dev, 2011. 21(1): p. 12-20.

3. Hata et al., *The BCL2 Family: Key Mediators of the Apoptotic Response to Targeted Anticancer Therapeutics.* Cancer Discov, 2015. 5(5): p. 475-87.
4. Letai, A. G., *Diagnosing and exploiting cancer's addiction to blocks in apoptosis.* Nat Rev Cancer, 2008. 8(2): p. 121-32.
5. Khoo, K. H., C. S. Verma, and D. P. Lane, *Drugging the p53 pathway: understanding the route to clinical efficacy.* Nat Rev Drug Discov, 2014. 13(3): p. 217-36.
6. Haupt, Y., et al., *Mdm2 promotes the rapid degradation of p53.* Nature, 1997. 387(6630): p. 296-9.
7. Wertz, I. E., et al., *Sensitivity to antitubulin chemotherapeutics is regulated by MCL1 and FBW7.* Nature, 2011. 471(7336): p. 110-4.
8. Rochaix, P., et al., *In vivo patterns of Bcl-2 family protein expression in breast carcinomas in relation to apoptosis.* J Pathol, 1999. 187(4): p. 410-5.
9. Zhang, B., I. Gojo, and R. G. Fenton, *Myeloid cell factor-1 is a critical survival factor for multiple myeloma.* Blood, 2002. 99(6): p. 1885-93.
10. Beroukhim, R., et al., *The landscape of somatic copy-number alteration across human cancers.* Nature, 2010. 463(7283): p. 899-905.
11. Kojima, K., et al., *Mdm2 inhibitor Nutlin-3a induces p53-mediated apoptosis by transcription-dependent and transcription-independent mechanisms and may overcome Atm-mediated resistance to fludarabine in chronic lymphocytic leukemia.* Blood, 2006. 108(3): p. 993-1000.
12. Hasegawa, H., et al., *Activation of p53 by Nutlin-3a, an antagonist of MDM2, induces apoptosis and cellular senescence in adult T-cell leukemia cells.* Leukemia, 2009. 23(11): p. 2090-101.
13. Tait, S. W. and D. R. Green, *Mitochondria and cell death: outer membrane permeabilization and beyond.* Nat Rev Mol Cell Biol, 2010. 11(9): p. 621-32.
14. Juin, P., et al., *Decoding and unlocking the BCL-2 dependency of cancer cells.* Nat Rev Cancer, 2013. 13(7): p. 455-65.
15. Oltersdorf, T., et al., *An inhibitor of Bcl-2 family proteins induces regression of solid tumours.* Nature, 2005. 435 (7042): p. 677-81.
16. Souers, A. J., et al., *ABT-199, a potent and selective BCL-2 inhibitor, achieves antitumor activity while sparing platelets.* Nat Med, 2013. 19(2): p. 202-8.
17. Pan, R., et al., *Selective BCL-2 inhibition by ABT-199 causes on-target cell death in acute myeloid leukemia.* Cancer Discov, 2014. 4(3): p. 362-75.
18. Roberts, A. W., et al., *Targeting BCL2 with Venetoclax in Relapsed Chronic Lymphocytic Leukemia.* N Engl J Med, 2016. 374(4): p. 311-22.
19. Seymour, J. F., et al., *Venetoclax plus rituximab in relapsed or refractory chronic lymphocytic leukaemia: a phase 1b study.* Lancet Oncol, 2017. 18(2): p. 230-240.
20. Konopleva, M., et al., *Efficacy and Biological Correlates of Response in a Phase II Study of Venetoclax Monotherapy in Patients with Acute Myelogenous Leukemia.* Cancer Discov, 2016. 6(10): p. 1106-1117.
21. DiNardo, C. D., et al., *Safety and preliminary efficacy of venetoclax with decitabine or azacitidine in elderly patients with previously untreated acute myeloid leukaemia: a non-randomised, open-label, phase 1b study.* Lancet Oncol, 2018. 19(2): p. 216-228.
22. Holohan, C., et al., *Cancer drug resistance: an evolving paradigm.* Nat Rev Cancer, 2013. 13(10): p. 714-26.
23. Phillips, D. C., et al., *Loss in MCL-1 function sensitizes non-Hodgkin's lymphoma cell lines to the BCL-2-selective inhibitor venetoclax (ABT-199).* Blood Cancer J, 2015. 5: p. e368.
24. Bodo, J., et al., *Acquired resistance to venetoclax (ABT-199) in t(14;18) positive lymphoma cells.* Oncotarget, 2016. 7(43): p. 70000-70010.
25. Lin, K. H., et al., *Targeting MCL-1/BCL-XL Forestalls the Acquisition of Resistance to ABT-199 in Acute Myeloid Leukemia.* Sci Rep, 2016. 6: p. 27696.
26. Ramsey, H. E., et al., *A Novel MCL-1 Inhibitor Combined with Venetoclax Rescues Venetoclax Resistant Acute Myelogenous Leukemia.* Cancer Discov, 2018.
27. Pan, R., et al., *Synthetic Lethality of Combined Bcl-2 Inhibition and p53 Activation in AML: Mechanisms and Superior Antileukemic Efficacy.* Cancer Cell, 2017. 32(6): p. 748-760.e6.
28. Tzelepis, K., et al., *A CRISPR Dropout Screen Identifies Genetic Vulnerabilities and Therapeutic Targets in Acute Myeloid Leukemia.* Cell Rep, 2016. 17(4): p. 1193-1205.
29. Li, W., et al., *MAGeCK enables robust identification of essential genes from genome-scale CRISPR/Cas9 knockout screens.* Genome Biol, 2014. 15(12): p. 554.
30. Doench, J. G., et al., *Optimized sgRNA design to maximize activity and minimize off-target effects of CRISPR-Cas9.* Nat Biotechnol, 2016. 34(2): p. 184-191.
31. Woo, I. S., et al., *TMEM14A inhibits N-(4-hydroxyphenyl)retinamide-induced apoptosis through the stabilization of mitochondrial membrane potential.* Cancer Lett, 2011. 309(2): p. 190-8.
32. Hershko, T. and D. Ginsberg, *Up-regulation of Bcl-2 homology 3 (BH3)-only proteins by E2F1 mediates apoptosis.* J Biol Chem, 2004. 279(10): p. 8627-34.
33. Imazu, T., et al., *Bcl-2/E1B 19 kDa-interacting protein 3-like protein (Bnip3L) interacts with bcl-2/Bcl-xL and induces apoptosis by altering mitochondrial membrane permeability.* Oncogene, 1999. 18(32): p. 4523-9.
34. Fischer, M., *Census and evaluation of p53 target genes.* Oncogene, 2017. 36(28): p. 3943-3956.
35. Findley, H. W., et al., *Expression and regulation of Bcl-2, Bcl-xl, and Bax correlate with p53 status and sensitivity to apoptosis in childhood acute lymphoblastic leukemia.* Blood, 1997. 89(8): p. 2986-93.
36. Tyner, J. W., et al., *Functional genomic landscape of acute myeloid leukaemia.* Nature, 2018.
37. Blankenberg, F. G., *In vivo detection of apoptosis.* J Nucl Med, 2008. 49 Suppl 2: p. 81s-95s.
38. Lagadinou, E. D., et al., *BCL-2 inhibition targets oxidative phosphorylation and selectively eradicates quiescent human leukemia stem cells.* Cell Stem Cell, 2013. 12(3): p. 329-41.
39. Jones, C. L., et al., *Inhibition of Amino Acid Metabolism Selectively Targets Human Leukemia Stem Cells.* Cancer Cell, 2018. 34(5): p. 724-740.e4.
40. Bensaad, K., et al., *TIGAR, a p53-inducible regulator of glycolysis and apoptosis.* Cell, 2006. 126(1): p. 107-20.
41. Polyak, K., et al., *A model for p53-induced apoptosis.* Nature, 1997. 389(6648): p. 300-5.
42. Li et al., *p53 regulates mitochondrial membrane potential through reactive oxygen species and induces cytochrome c-independent apoptosis blocked by Bcl-2.* Embo j, 1999. 18(21): p. 6027-36.
43. Vander Heiden et al., *Understanding the Warburg effect: the metabolic requirements of cell proliferation.* Science, 2009. 324(5930): p. 1029-33.

44. Kirshner, J. R., et al., *Elesclomol induces cancer cell apoptosis through oxidative stress.* Mol Cancer Ther, 2008. 7(8): p. 2319-27.
45. Ardini, E., et al., *Entrectinib, a Pan-TRK, ROS1, and ALK Inhibitor with Activity in Multiple Molecularly Defined Cancer Indications.* Mol Cancer Ther, 2016. 15(4): p. 628-39.
46. Hedvat, M., et al., *The JAK2 inhibitor AZD1480 potently blocks Stat3 signaling and oncogenesis in solid tumors.* Cancer Cell, 2009. 16(6): p. 487-97.
47. Tognon, C., et al., *The chimeric protein tyrosine kinase ETV6-NTRK3 requires both Ras-Erk1/2 and PI3-kinase-Akt signaling for fibroblast transformation.* Cancer Res, 2001. 61(24): p. 8909-16.
48. Lannon, C. L., et al., *A highly conserved NTRK3 C-terminal sequence in the ETV6-NTRK3 oncoprotein binds the phosphotyrosine binding domain of insulin receptor substrate-1: an essential interaction for transformation.* J Biol Chem, 2004. 279(8): p. 6225-34.
49. Davare, M. A. and C. E. Tognon, *Detecting and targetting oncogenic fusion proteins in the genomic era.* Biol Cell, 2015. 107(5): p. 111-29.
50. Vaishnavi et al., *TRKing down an old oncogene in a new era of targeted therapy.* Cancer Discov, 2015. 5(1): p. 25-34.
51. Nakagawara, A., et al., *Association between high levels of expression of the TRK gene and favorable outcome in human neuroblastoma.* N Engl J Med, 1993. 328(12): p. 847-54.
52. Edelmann et al., *Managing Patients With TP53-Deficient Chronic Lymphocytic Leukemia.* J Oncol Pract, 2017. 13(6): p. 371-377.
53. DiNardo, C. D., et al., *Venetoclax combined with decitabine or azacitidine in treatment-naive, elderly patients with acute myeloid leukemia.* Blood, 2018.
54. Vogelstein et al., *Surfing the p53 network.* Nature, 2000. 408(6810): p. 307-10.
55. Levine, A. J. and M. Oren, *The first 30 years of p53: growing ever more complex.* Nat Rev Cancer, 2009. 9(10): p. 749-58.
56. Joshi-Tope, G., et al., *Reactome: a knowledgebase of biological pathways.* Nucleic Acids Res, 2005. 33(Database issue): p. D428-32.
57. Palmieri, F., *The mitochondrial transporter family SLC25: identification, properties and physiopathology.* Mol Aspects Med, 2013. 34(2-3): p. 465-84.
58. Verrier, F., et al., *Study of PTPC composition during apoptosis for identification of viral protein target.* Ann N Y Acad Sci, 2003. 1010: p. 126-42.
59. Rodriguez-Enriquez et al., *Role of mitochondrial permeability transition pores in mitochondrial autophagy.* Int J Biochem Cell Biol, 2004. 36(12): p. 2463-72.
60. Prokesch, A., et al., *Liver p53 is stabilized upon starvation and required for amino acid catabolism and gluconeogenesis.* Faseb j, 2017. 31(2): p. 732-742.
61. Shalem, O., et al., *Genome-scale CRISPR-Cas9 knockout screening in human cells.* Science, 2014. 343(6166): p. 84-87.
62. Martin, M., *Cutadapt removes adapter sequences from high-throughput sequencing reads.* EMBnet.journal, 2011 (DOI: https://doi.org/10.14806/ej.17.1.200).
63. Langmead et al., *Fast gapped-read alignment with Bowtie 2.* Nat Methods, 2012. 9(4): p. 357-9.
64. Li, W., et al., *Quality control, modeling, and visualization of CRISPR screens with MAGeCK-VISPR.* Genome Biol, 2015. 16: p. 281.
65. Koster et al., *Snakemake—a scalable bioinformatics workflow engine.* Bioinformatics, 2012. 28(19): p. 2520-2.
66. Nemkov et al., *Three-minute method for amino acid analysis by UHPLC and high-resolution quadrupole orbitrap mass spectrometry.* Amino Acids, 2015. 47(11): p. 2345-57.

Table 1. g-profiler analyses of top 235 statistically significantly enriched sgRNA hits in venetoclax-resistant cells from Y. Kosuke with log 2 fold change and 80% minimum concordance in significant sgRNA effect.*

TABLE 1 g-profiler analyses of statistically significantly enriched sgRNA hits in venetoclax-resistant cells

| GO.ID | Description | p-value | FDR adj-p value | Genes |
| --- | --- | --- | --- | --- |
| GO:0097345 | mitochondrial outer membrane permeabilization | 8.43E–03 | 8.43E–03 | BAK1, BAX, TMEM14A, BNIP3L, TP53, PMAIP1, TFDP1 |
| GO:0046902 | regulation of mitochondrial membrane permeability | 9.16E–03 | 9.16E–03 | BAK1, BAX, TMEM14A, BNIP3L, TP53, PMAIP1, SLC25A6, TFDP1 |
| REAC:R-HSA-6803204 | TP53 Regulates Transcription of Genes Involved in Cytochrome C Release | 3.54E–02 | 3.54E–02 | BAX, BNIP3L, TP53, PMAIP1 |
| REAC:R-HSA-111448 | Activation of NOXA and translocation to mitochondria | 6.75E–03 | 6.75E–03 | TP53, PMAIP1, TFDP1 |

Significant associations are shown for top 235 statistically significantly enriched sgRNA hits in venetoclax-resistant cells from Y. Kosuke with ≥3 log2 fold change and 80% minimum concordance in significant sgRNA effect.*

FIGURE LEGENDS

FIG. 1. Genome-wide Crispr/Cas9 screen in AML cells identified TP53, BAX and other apoptosis network genes conferring sensitivity to venetoclax. FIG. 1A. Schematic representation of lentiviral vectors described elsewhere in detail [28] and used for delivery and functional assay of Cas9. Top: Cas-9 expressing vector; Blsd, blasticidin selection gene, EF1a, intron-containing human elongation factor 1a promoter, Cas9, codon-optimized *Streptococcus pyogenes* double-NLS-tagged Cas9, 2A, Thosea asigna virus 2A peptides. Bottom: vector carrying dual fluorescent proteins; GFP and mCherry expressed from the PGK promoter, U6 denotes human U6 promoter driving GFP sgRNAs or empty cassette, Scaff., sgRNA scaffold. 1B. Schematic representation of genome wide screen for drug resistance. The sgRNA library [28] was transduced into Cas9-expressing MOLM-13 cells, selected with puromycin for the integration of sgRNA-carrying virus for 5 days and DNA collected from cells exposed to venetoclax (1 μM) or vehicle (DMSO) for various time points (days 0, 7, 14, 21). sgRNA barcodes were PCR-amplified and subjected to deep sequencing to analyze for enrichment and/or dropout. FIG. 10. Normalized counts of sgRNAs from collected DNA samples, median, upper and lower quartiles are shown for representative replicate samples. FIGS. 1D, 1E. Enrichment effect in Y. Kosuke (Figure E) and Brunello (Figure F) library screens for loss-of-sensitivity to venetoclax. Fold change and corresponding p-values are plotted; genes representing significant hits in both libraries are highlighted in red. FIG. 1F. Enrichment extent plotted as fold change over control following venetoclax exposure (day 14) for the set of individual top hit sgRNAs per gene is shown (Y. Kosuke library). FIG. 1G. Box and whisker plots spanning min/max values of normalized counts for control (left boxes in each pair) and venetoclax treatment (right boxes in each pair) combined for all sgRNAs per gene. Top hits are shown.

FIG. 2. A. Confirmation of genes conferring venetoclax resistance in MOLM-13 and MV4;11 cells and correlations with changes in apoptotic gene transcription in AML patients. MOLM-13 (FIG. 2A) or MV4;11 (FIG. 2B) cells were transduced with lentiviruses carrying single sgRNA/Cas9 constructs targeting TP53, BAX, PMAIP1, FAU or control (non-targeting; NT_g). 10 days post transduction, venetoclax sensitivity was measured in triplicate by colorimetric MTS assay using a 7-point concentration range (4 nM to 10 μM). Percentages of viable cells, after normalization to untreated controls, were fit using non-linear regression analyses; mean and standard errors are shown. MOLM-13P, parental MOLM-13 cells. MV4;11P, parental MV4;11 cells. FIG. 2C. Histogram (log 2 scale) summarizing changes in venetoclax sensitivity in parental MOLM-13 (black shaded), parental MV4;11 cells (grey shaded) or cells transduced with indicated sgRNA/Cas9 viruses., $IC_{50}$ values were calculated by non-linear regression analyses in the cell viability assay described in panel A. FIG. 2D. Western blot analyses of proteins extracted from MOLM-13 cells, transduced with indicated sgRNA/Cas9 viruses and identified with antisera to BAX, BCL2, BCL2L1(BCLXL), MCL1 and GAPDH. Note: for TP53, four sgRNAs producing distinct knockout alleles were used to confirm changes in expression levels of BCL2, BCL2L1(BCLXL), MCL1. sgRNA targeting KMT2C was used as an additional unrelated sgRNA control. FIG. 2E. Correlation of TP53 expression with respect to expression of selected genes in an AML patient sample cohort (n=442; [36]. k, slopes generated by linear regression; r, Spearman coefficient; , $p<0.01$; **, $p<0.0001$.

FIG. 3. Venetoclax sensitivity in AML patients inversely correlates with TP53 mutations and low expression of TP53 and BAX. 3A. Venetoclax (VEN) sensitivity in primary AML patient samples was measured in a viability assay across a concentration series ranging from 10 nM to 10 μM. AUC was determined for each sample and plotted relative to TP53 mutant status or TP53 expression levels. LE and HE denote lowest and highest quartile expression values, respectively. Statistical analysis by Kruskal-Wallis revealed no significant difference between TP53 mutant (mut) and wild type (wt) TP53 with low TP53 expression. Both groups differ significantly from TP53 wt with high expression levels of TP53. , $p<0.01$, , $p<0.0001$, ns, not significant. Within TP53 mutant groups, circles, triangles and square symbols denote loss of function (LOF), gain of function (GOF), and splice variants correspondingly. 3B. Correlation between gene expression levels from AML patient samples for TP53, BAX, PMAIP1 and TMEM14A to the respective venetoclax sensitivities represented by AUC (n=442; [36]). k, slope values generated by linear regression; r, Spearman coefficient; **, $p<0.0001$; ns, not significant.

FIG. 4. Cells with loss-of-function alleles for TP53 or BAX have diminished apoptosis in response to venetoclax treatment. FIG. 4A. Sensitivity to venetoclax in MOLM-13 parental cells (MOLM13P) and MOLM13 cells with sgRNA inactivated alleles, as indicated, was assessed by flow cytometry after staining with the early apoptosis marker, Annexin V, following 24, 48 and 72 hrs of exposure to venetoclax (100 nM). Histogram represents mean and standard deviation for three replicates of percentage Annexin V+ cells in the total cell population. FIG. 4B. Western blot analysis of proteins extracted from MOLM-13 parental and MOLM-13 cells transduced with indicated sgRNA/Cas9 viruses and treated overnight with 100 nM venetoclax or vehicle (DMSO), and identified with antisera to phosphorylated ERK1/2 (Thr202/Tyr204, pERK1/2), ERK1/2, phosphorylated AKT (Thr308), AKT and GAPDH.

FIG. 5. Cells with TP53 and BAX inactivation are resistant to mitochondrial stress induced by venetoclax and mitochondrial uncouplers FIG. 5A. Histogram of a representative mitophagy experiment (n=2). Note that number of mitochondria fused to lysosome is significantly less in MOLM-13 cells with knockout of TP53 (TP53_g) and BAX (BAX g) relative to control parental and nontargetting (NT_g) cells in the presence of uncoupler CCCP with and without venetoclax(VEN). FIG. 5B. Histogram of a representative experiment from C (n=2) with 10,000 cells analyzed per sample. FIGS. 5C, 5D. Analyses of oxygen consumption rate (OCR) and extracellular acidification rates (ECAR) using Seahorse assay (n=3). FIG. 5E. Measurement of Reactive Oxygen Species (ROS) using 2',7'-dichlorofluorescin diacetate (DCFDA, Abcam) substrate as an indicator of oxidation inside the cell. Note higher rate of reactive oxygen species in TP53 and BAX KO cells (n=6). FIG. 5F. Cell viability assay in response to elesclomol.

FIG. 6. Metabolic changes in TP53 and BAX KO cells are indicative of increased cell proliferation. Global metabolomics profile of MOLM-13 TP53 and BAX KO cells. Metabolomics were performed on samples in quadruplicate. Top 50 changed metabolites are shown. Pathway analysis of metabolites with differential abundance dot plot for MOLM13 TP53 (FIG. 6A) and BAX KO (FIG. 6B) cells. Red to yellow color gradient indicates higher to lower statistical significance, circle size is proportional to the percent of impacted metabolites within the pathway. (FIG. 6C). Summary of genes identified by the Crispr/Cas9 screen impacting mitochondrial homeostasis, energy production, apoptosis and venetoclax response. Star symbol indicates identified genes (TP53 (p53), TFDP1 (DP-1), NOXA (PMAIP1), BAX/BAK, TMEM14A, SLC25A6(ANT3). Mechanisms of venetoclax resistance in cells with inactivation of TP53 (FIG. 6D), or BAX (FIG. 6E). Inactivation of TP53 leads to perturbation in expression of pro-survival proteins, including BCL2, the primary venetoclax target. Inactivation of BAX leads to inability to build effective MOMP during apoptosis, induced by venetoclax.

FIG. 7. Cells with loss-of-function alleles for TP53 or BAX have altered sensitivities to small molecule inhibitors of various signaling pathways.

FIG. 7A. MOLM-13 and MV4;11 cells, transduced with indicated sgRNAs/Cas9 viruses, were screened with a panel of inhibitors targeting various molecular pathways and assessed using the cell survival method described in FIG. 2A. Fold changes in $IC_{50}$ values, (log 10 scale) for those inhibitors concordant across both cells lines relative to nontargetting control are shown.

FIG. 7B. Analyses of FLT3 inhibitor sensitivities, in MOLM-13 and MV4;11 parental and Crispr-modified cells, as indicated. Drug sensitivity was measured as described in FIG. 2A, with $IC_{50}$ measured in triplicate.

FIG. 7C. Drug sensitivity to NTRK inhibitors entrectinib (top) and larotrectinib (bottom), in MOLM-13 cells transduced with indicated sgRNAs/Cas9 viruses.

Figure 7D:
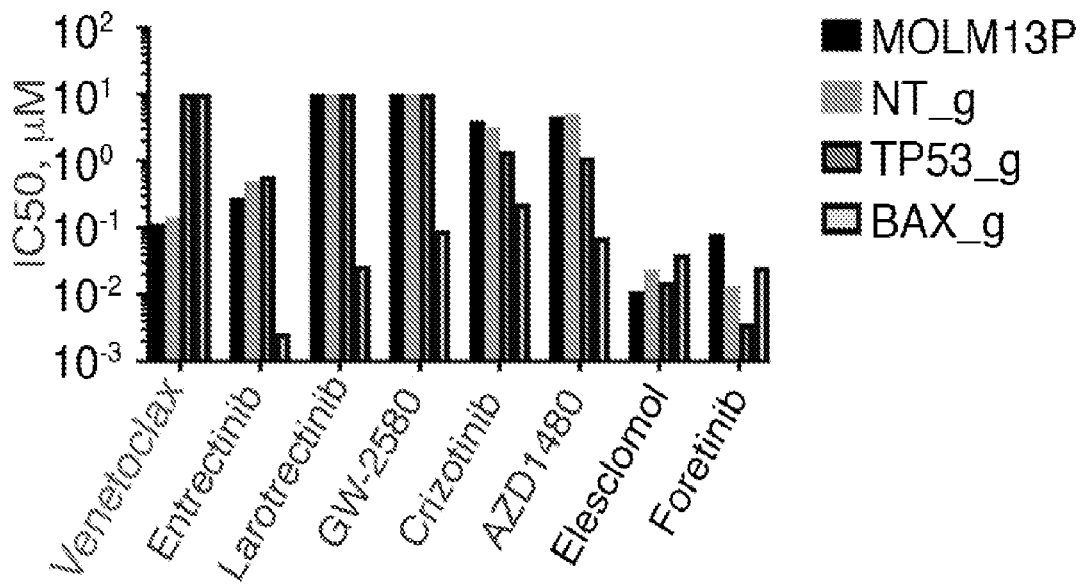
FIG. 7D provides a histogram of sensitivities ($IC_{50}$ values) to a series of NTRK inhibitors in MOLM-13 cells, transduced with indicated sgRNAs/Cas9 viruses.
Figure 7E:
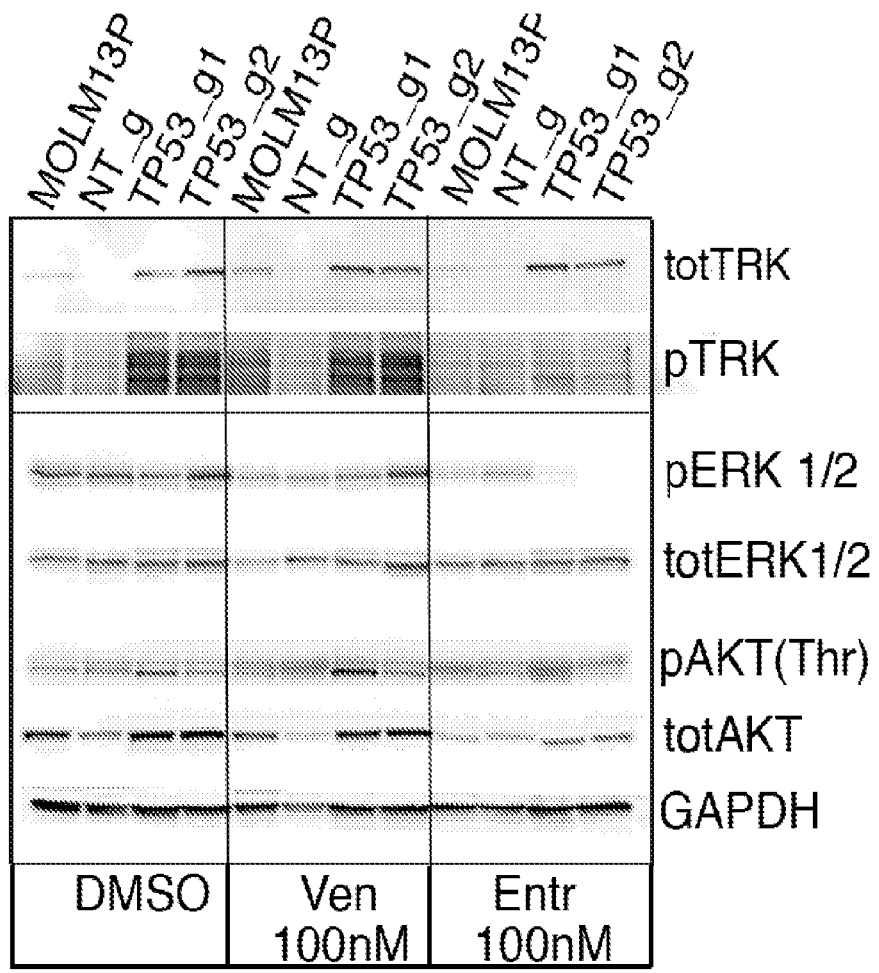
FIG. 7E depicts a Western blot analyses of proteins extracted from MOLM-13 parental and MOLM-13 transduced with TP53 sgRNA/Cas9 viruses and treated overnight with venetoclax (100 nM), entrectinib (100 nM) or DMSO (vehicle), and identified with antisera.
Figure 7F:
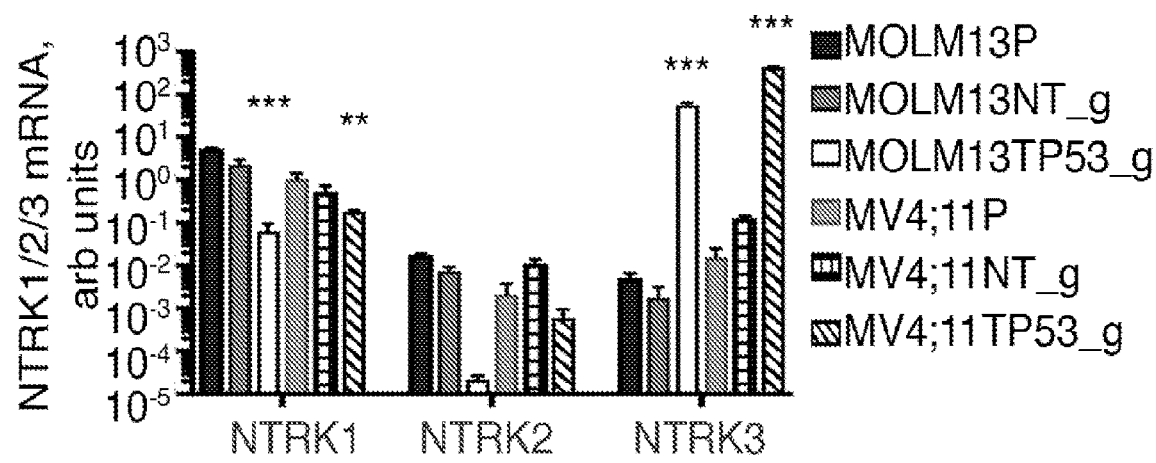
FIG. 7F represents expression levels of NTRK1,2,3 mRNA using qRT-PCR analysis with RNAs isolated from MOLM-13 and MV4;11 cells with TP53 KO alleles or non-targeting (NT) control, normalized to 36B4 gene expression levels.
Figure 7G:
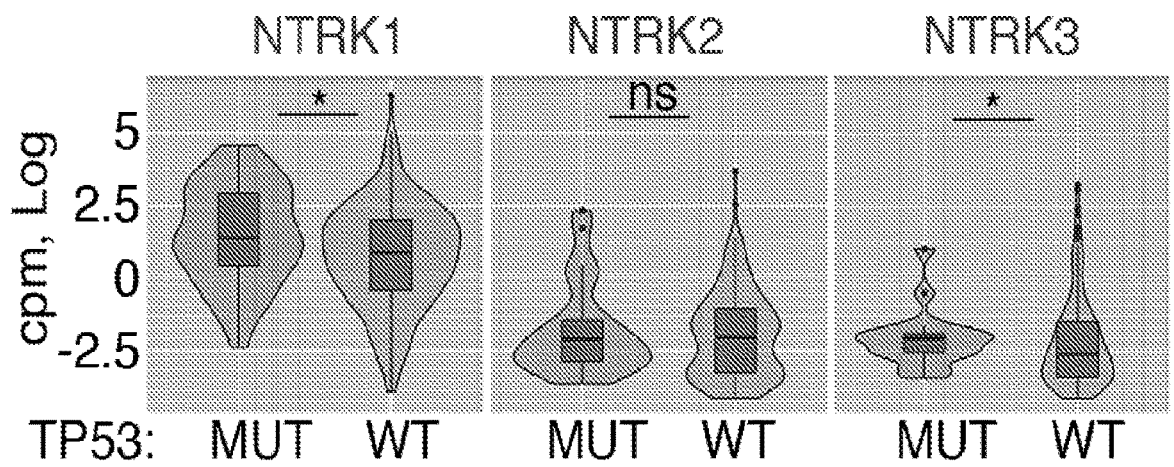
FIG. 7G represents a correlation of NTRK1,2,3 expression levels (cpm) with TP53 status in 284 AML patient samples. *, $p<0.05$.

FIG. 7D. Histogram of sensitivities ($IC_{50}$ values) to a series of NTRK inhibitors in MOLM-13 cells, transduced with indicated sgRNAs/Cas9 viruses;

FIG. 7E. Western blot analyses of proteins extracted from MOLM-13 parental and MOLM-13 transduced with TP53 sgRNA/Cas9 viruses and treated overnight with venetoclax (100 nM), entrectinib (100 nM) or DMSO (vehicle), and identified with antisera to pan NTRK, phosphorylated NTRK, phosphorylated ERK1/2, ERK1/2, phosphorylated AKT, AKT and GAPDH.

FIG. 7F. Expression levels of NTRK1,2,3 mRNA using qRT-PCR analysis with RNAs isolated from MOLM-13 and MV4;11 cells with TP53 KO alleles or non-targeting (NT) control. Expression values were normalized to 36B4 gene expression levels. Statistical significance was determined by t-test ***, p<0.001.

7G. Correlation of NTRK1,2,3 expression levels (cpm) with TP53 status in 284 AML patient samples. *, p<0.05.

FIG. 8. Tier structure for evaluating CRISPR genome screens. Scheme indicating process of prioritizing sgRNA hits from a genome-wide screen. For all sgRNAs considered, a read count minimum of 100 reads and a maximum q-value of <0.05 was required. Tier 1 hits are defined as having a minimum log 2-fold change ≥2, a proportion of sgRNAs for a given gene ≥75%, and a concordance among those sgRNAs ≥75% (149 sgRNAs satisfied these criteria). Tier 2 hits are defined as having a minimum log 2-fold change ≥2 and a concordance among those sgRNAs=100% (367 sgRNAs satisfied these criteria). Tier 3 hits are defined as having a minimum log 2-fold change ≥1 and a concordance among those sgRNAs=100% (1090 sgRNAs satisfied these criteria). In addition to these tiers, we identified a set of hits, termed singletons (n=167) defined as having a minimum log 2-fold change ≥2, a maximum q-value of <0.05, and adjusted sgRNA count=1 and an average control mean ≥100 reads.

Figure 9B:
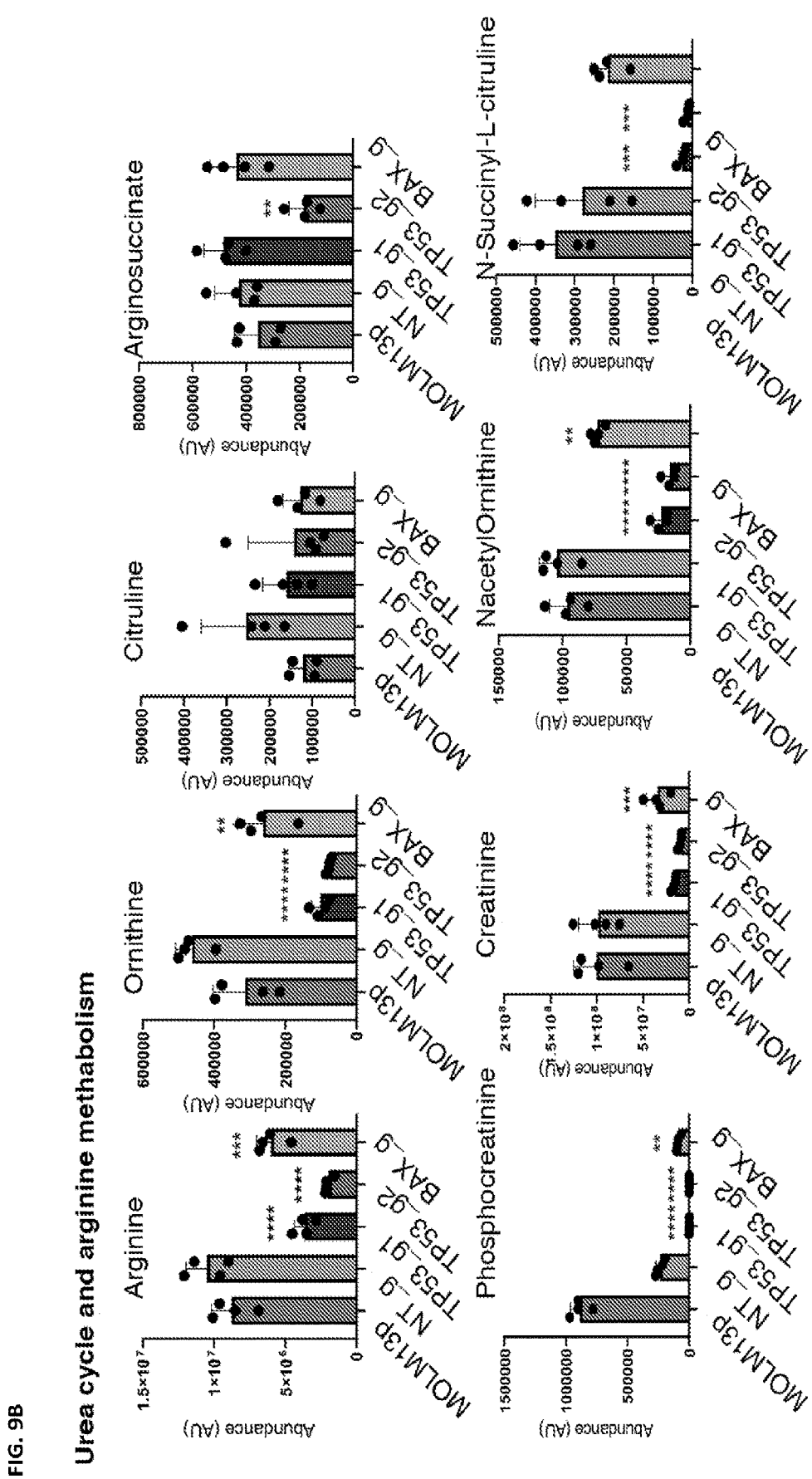
FIG. 9B represents metabolites analyzed for urea cycle and arginine metabolism pathways for TP53 and BAX KO cells in comparison to non-targeting control.

FIGS. 9A and 9B. Metabolites analyzed for the various metabolic pathways for TP53 and BAX KO cells in comparison to non-targeting control.

FIG. 10. Dose response curve responses used to create histograms for FIG. 7B.

Figure 11A:
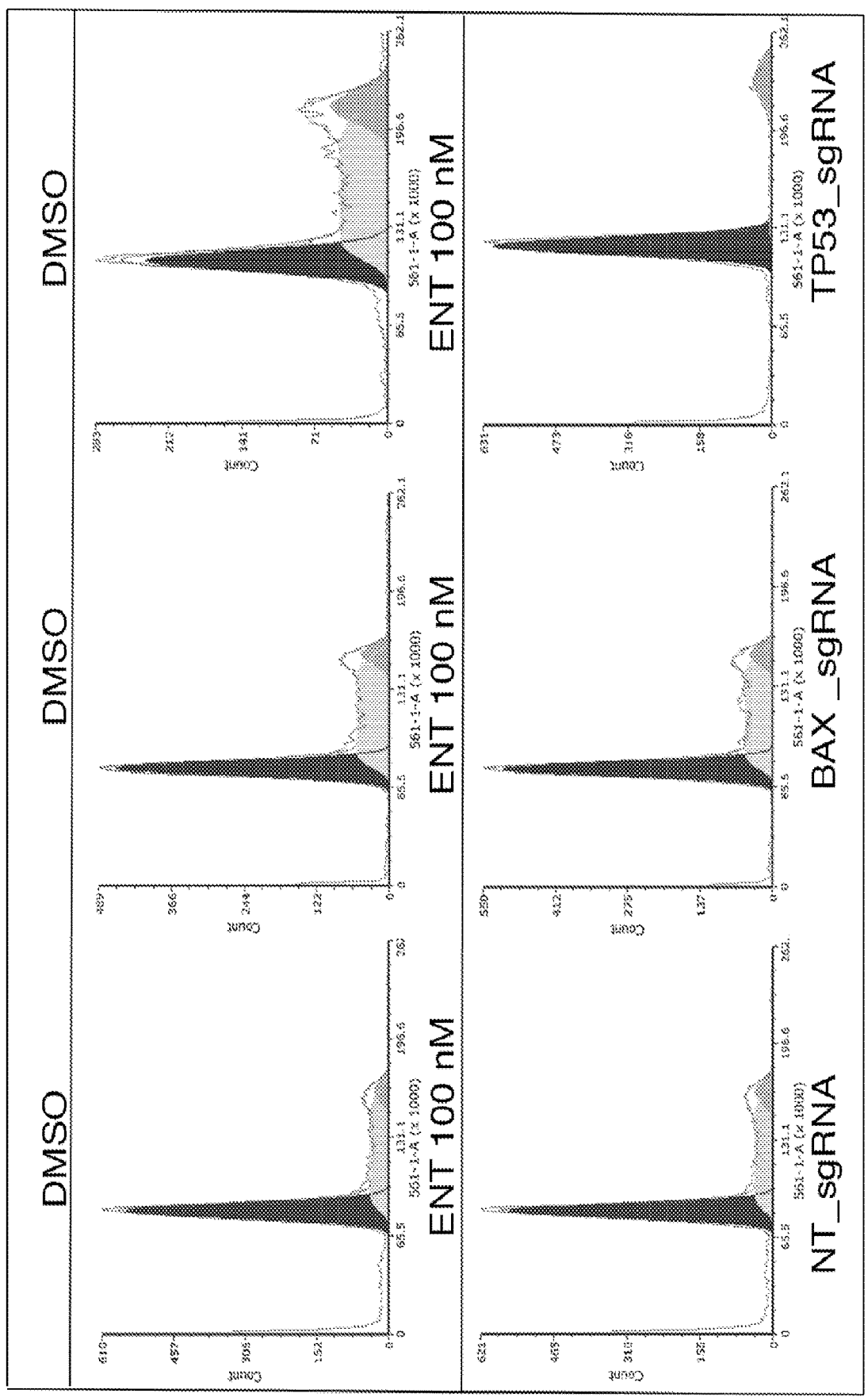
FIG. 11A represents flow cytometry analyses of cells treated with 100 nM entrectinib o/n or vehicle alone.
Figure 11B:
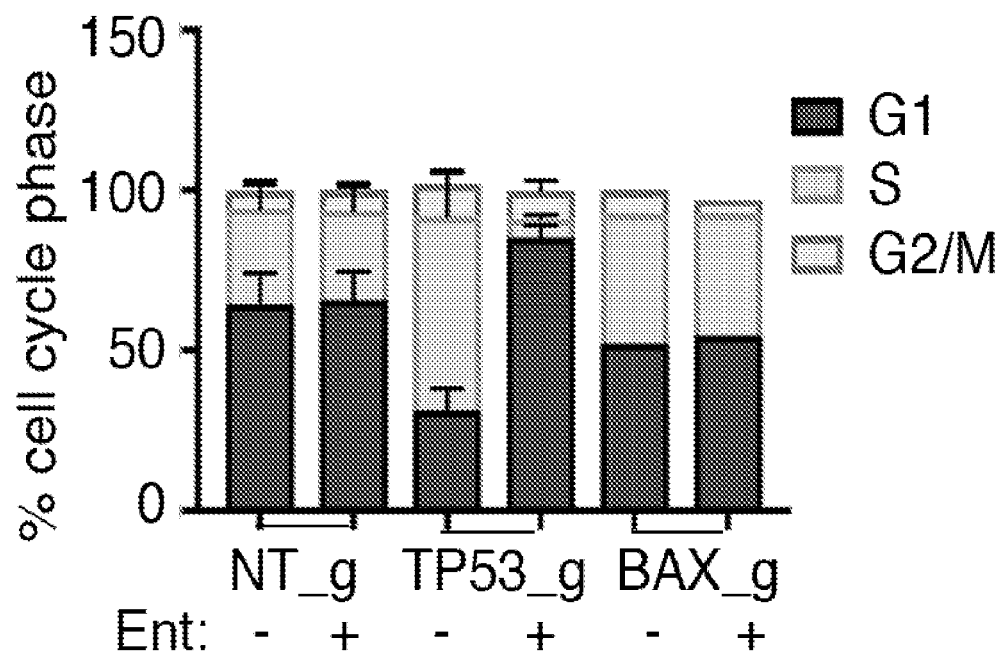
FIG. 11B provides a histogram representing cell cycle profiles of MOLM-13 cells transduced with sgRNAs/Cas9 viruses for non-targeting sgRNA (NT_g, n=3), TP53 sgRNA (TP53_g, n=3) or BAX (n=1).
Figure 11C:
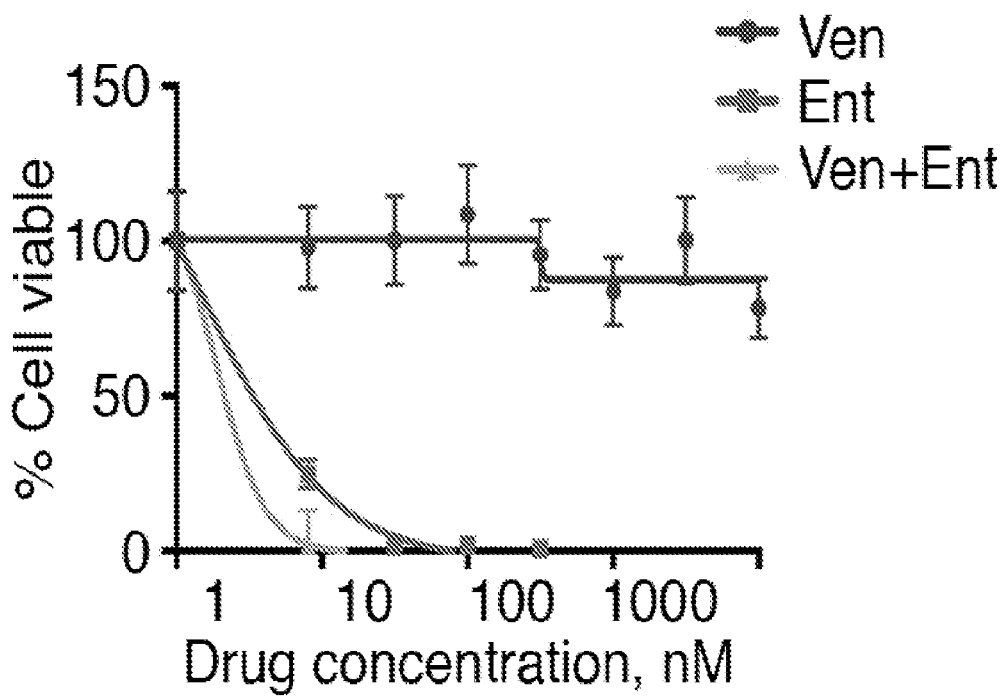
FIG. 11C provides a graph of a cell viability assay assessment of the sensitivity of the entrectinib and venetoclax combination relative to sensitivities for each single agent on MOLM-13 cells transduced with sgRNAs/Cas9 viruses for TP53 sgRNA.
Figure 12:
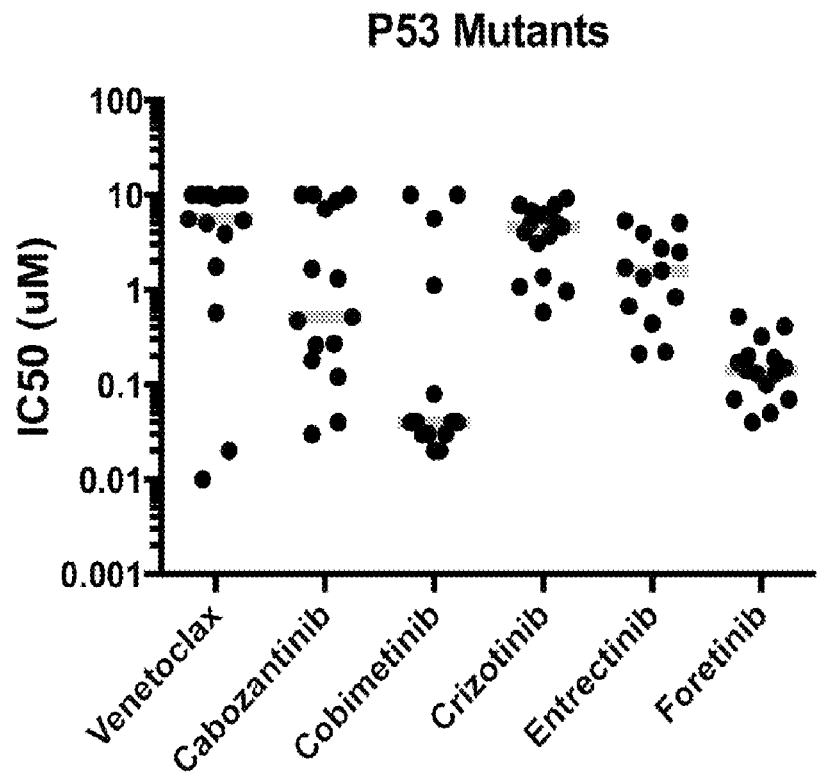
FIG. 12 provides a histogram representing drug sensitivity, measured in primary AML patient cells ex vivo.

FIG. 11. Entrectinib arrests cells with loss-of-function alleles for TP53 in G1. (FIG. 11A). Flow cytometry analyses of cells treated with 100 nM entrectinib o/n or vehicle alone. (FIG. 11B). Histogram representing cell cycle profiles of MOLM-13 cells transduced with sgRNAs/Cas9 viruses for non-targeting sgRNA (NT_g, n=3), TP53 sgRNA (TP53_g, n=3) or BAX (n=1); mean and standard deviation are shown where appropriate. (FIG. 11C). Cell viability assay assessing the sensitivity of the combination of entrectinib and venetoclax relative to sensitivities for each single agent on MOLM-13 cells transduced with sgRNAs/Cas9 viruses for TP53 sgRNA. Data were fit to a non-linear regression analysis with means and standard errors.

FIG. 12. Selected ex vivo drug sensitivity in AML patients' cells with mutant TP53 mutations. Histogram representing drug sensitivity, measured in primary AML patient cells ex vivo, in a viability MTS assay across a concentration series ranging from 10 nM to 10 μM, using 10,000 cells per well, in triplicates. Note several patient cells specimens have low sensitivity to venetoclax and relatively high sensitivity to entrectinib. Red bars denote median $IC_{50}$ value.

FIG. 13. Analyses of Venetoclax sensitivities in CLL and AML patient cohorts ex vivo. Scatter plot of $IC_{50}$ values are indicated. Mann-Whitney test was performed on $IC_{50}$ values to ascertain statistical differences of mean. ***, p<0.001. Median $IC_{50}$ values for CLL (141 patients) and AML (289 patients) were 1.4 μM and 0.1 μM, correspondingly.

What is claimed:

1. A method of treating venetoclax-resistant acute myeloid leukemia in a subject, wherein the venetoclax-resistant acute myeloid leukemia is characterized by low expression of TP53 or expression associated with a mutation in the TP53 gene, the method comprising administering to the subject in need thereof a therapeutically effective amount of a NTRK/ALK/ROS1 inhibitor selected from the group of entrectinib, larotrectinib, crizotinib, alectinib, lorlatinib, ceritnib, repotrectinib, GW-2580, and AZD-1480, or a pharmaceutically acceptable salt thereof.

2. A method of treating venetoclax-resistant acute myeloid leukemia in a subject, wherein the venetoclax-resistant acute myeloid leukemia is characterized by low expression of TP53, the method comprising administering to the subject in need thereof a therapeutically effective amount of a NTRK/ALK/ROS1 inhibitor selected from the group of entrectinib, larotrectinib, crizotinib, alectinib, lorlatinib, ceritnib, repotrectinib, GW-2580, and AZD-1480, or a pharmaceutically acceptable salt thereof.

3. A method of treating venetoclax-resistant acute myeloid leukemia in a subject, wherein the venetoclax-resistant acute myeloid leukemia is characterized by a mutation in the TP53 gene, the method comprising administering to the subject in need thereof a therapeutically effective amount of a NTRK/ALK/ROS1 inhibitor selected from the group of entrectinib, larotrectinib, crizotinib, alectinib, lorlatinib, ceritnib, repotrectinib, GW-2580, and AZD-1480, or a pharmaceutically acceptable salt thereof.

4. The method of any one of claims 1 and 3, wherein the mutation in the TP53 gene is a point mutation.

5. The method of any one of claims 1 and 3, wherein the mutation in the TP53 gene is TP53 deletion.

6. The method of claim 5 wherein the, the TP53 deletion is a monoallelic deletion.

7. The method of claim 5 wherein the, the TP53 deletion is a biallelic deletion.

8. The method of claim 1, wherein the NTRK/ALK/ROS1 inhibitor is selected from the group of entrectinib, larotrectinib, crizotinib, or a pharmaceutically acceptable salt thereof.

9. The method of claim 2, wherein the NTRK/ALK/ROS1 inhibitor is selected from the group of entrectinib, larotrectinib, crizotinib, or a pharmaceutically acceptable salt thereof.

10. The method of claim 3, wherein the NTRK/ALK/ROS1 inhibitor is selected from the group of entrectinib, larotrectinib, crizotinib, or a pharmaceutically acceptable salt thereof.

11. The method of claim 1, wherein the method further comprises administering to the subject in need thereof a therapeutically effective amount of venetoclax.

12. The method of claim 2, wherein the method further comprises administering to the subject in need thereof a therapeutically effective amount of venetoclax.

13. The method of claim 3, wherein the method further comprises administering to the subject in need thereof a therapeutically effective amount of venetoclax.

\* \* \* \* \*